(12) United States Patent
Mayer et al.

(10) Patent No.: US 10,251,227 B2
(45) Date of Patent: Apr. 2, 2019

(54) CLOCKED ELECTRONIC ENERGY CONVERTER

(71) Applicant: OSRAM GmbH, Munich (DE)

(72) Inventors: Siegfried Mayer, Moosinning (DE); Olaf Busse, Munich (DE); Christof Schwarzfischer, Wackersberg (DE); Maximilian Gerber, Munich (DE)

(73) Assignee: OSRAM GMBH, Munich (DE)

( * ) Notice: Subject to any disclaimer, the term of this patent is extended or adjusted under 35 U.S.C. 154(b) by 22 days.

(21) Appl. No.: 15/516,041

(22) PCT Filed: Sep. 28, 2015

(86) PCT No.: PCT/EP2015/072260
§ 371 (c)(1),
(2) Date: Mar. 31, 2017

(87) PCT Pub. No.: WO2016/050689
PCT Pub. Date: Apr. 7, 2016

(65) Prior Publication Data
US 2018/0235042 A1    Aug. 16, 2018

(30) Foreign Application Priority Data

Oct. 2, 2014 (DE) .................. 10 2014 220 099

(51) Int. Cl.
*H05B 37/02*    (2006.01)
*H05B 33/08*    (2006.01)
(Continued)

(52) U.S. Cl.
CPC ........ *H05B 33/0815* (2013.01); *H02M 3/155* (2013.01); *H05B 33/0845* (2013.01);
(Continued)

(58) Field of Classification Search
CPC ................ H05B 37/02; H05B 33/0815; H05B 33/0845; H02M 3/155; H02M 2001/0009;
(Continued)

(56) References Cited

U.S. PATENT DOCUMENTS 9,705,403 B2 * 7/2017 Nene .................... H02M 3/1588
9,787,302 B2 * 10/2017 Deng .................. H03K 17/6871
(Continued)

OTHER PUBLICATIONS

German Search Report based on application No. 10 2014 220 099.7 (7 pages) dated Apr. 7, 2015.
(Continued)

*Primary Examiner* — Don Le
(74) *Attorney, Agent, or Firm* — Viering, Jentschura & Partner MBB

(57) ABSTRACT

A clocked electronic energy converter having an electronic switching element, at least two electrical energy storage devices, a terminal for connecting an electrical energy source, a terminal for connecting an electrical energy sink, a clock generator for controlling and operating the electronic switching element during switching operation and an adjusting unit which provides a first signal for adjusting the power-to-be-transmitted by the energy converter, is disclosed. The clock generator is designed to adjust the power-to-be-transmitted by the energy converter in a first output range by means of the switch-on time of the electronic switching element and, in a second output range in which the power-to-be-transmitted by the energy converter is less than in the first output range, to adjust the power-to-be-transmitted by the energy converter in the second output range by a combination of the switch-on time and the supplemental switch-off time, the supplemental switch-off time being constant.

15 Claims, 15 Drawing Sheets

(51) Int. Cl.
H02M 3/155 (2006.01)
H02M 1/00 (2006.01)

(52) U.S. Cl.
CPC ..... H05B 37/02 (2013.01); *H02M 2001/0009* (2013.01); *H02M 2001/0035* (2013.01); *Y02B 20/346* (2013.01); *Y02B 70/16* (2013.01)

(58) Field of Classification Search
CPC ........... H02M 2001/0035; Y02B 70/16; Y02B 20/346
USPC .......................................................... 315/291
See application file for complete search history.

(56) References Cited

U.S. PATENT DOCUMENTS

| | | | |
|---|---|---|---|
| 9,812,945 B2* | 11/2017 | Li | H02M 1/32 |
| 9,912,242 B2* | 3/2018 | Djenguerian | H02M 3/33507 |
| 2012/0286686 A1 | 11/2012 | Watanabe et al. | |
| 2013/0016530 A1* | 1/2013 | Lipcsei | H02M 1/40 363/16 |
| 2014/0016373 A1* | 1/2014 | Zhang | H02M 3/33523 363/21.15 |
| 2014/0078798 A1 | 3/2014 | Turchi | |
| 2016/0336870 A1* | 11/2016 | Halim | H02M 1/4225 |
| 2017/0250614 A1* | 8/2017 | Pregitzer | H02M 3/33515 |
| 2017/0302160 A1* | 10/2017 | Marcinkiewicz | H02M 1/42 |

OTHER PUBLICATIONS

International Search Report based on application No. PCT/EP2015/072260 (7 pages) dated Mar. 30, 2016.

Infineon Technologies AG, "ICs for Consumer Electronics TDA 16846/TDA 16847: Controller for Switch Mode Power Supplies Supporting Low Power Standby and Power Factor Correction", 2000, 28 pages, Germany.

Infineon Technologies AG, "Quasi-Resonant PWM Controller ICE2QS03G:Off-Line SMPS Quasi-Resonant PWM Controller with integrated 500V startup cell in DSO8", 2014, 24 pages, Germany.

* cited by examiner

CLOCKED ELECTRONIC ENERGY CONVERTER

RELATED APPLICATIONS

The present application is a national stage entry according to 35 U.S.C. § 371 of PCT application No.: PCT/EP/2015/072260 filed on Sep. 28, 2015, which claims priority from German application No.: 10 2014 220 099.7 filed on Oct. 2, 2014, and is incorporated herein by reference in its entirety.

TECHNICAL FIELD

The present disclosure relates to a clocked electronic energy converter having an electronic switching element, at least two electrical energy storage devices, one first terminal for connecting to an electrical energy source, one second terminal for connecting an electrical energy sink, a clock generator for driving and operating the electronic switching element during switching operation and one input terminal for a first signal for adjusting a power to be transmitted by the energy converter. The energy converter also includes a first timer connected to the clock generator and the input terminal for providing a second signal representing a switch-on time, the clock generator being designed to adjust the power to be transmitted by the energy converter in a first power range by means of the switch-on time of the electronic switching element, and a second timer connected to the clock generator and the input terminal for providing a third signal representing a supplemental switch-off time in a second power range in which the power to be transmitted by the energy converter is less than in the first power range, the clock generator being designed to adjust the power to be transmitted by the energy converter in the second power range by means of a combination of the second and the third signal. Furthermore, the present disclosure relates to a lighting device having a lighting means and an electronic terminal for connecting the lighting device to an electrical energy source. Finally, the present disclosure relates to a method for adjusting an electrical power to be transmitted by means of a clocked electronic energy converter for which purpose an electronic switching element of the electronic energy converter is operated in a clocked manner with a switch-on time, the power to be transmitted by the energy converter being adjusted in a first power range by means of the switch-on time in which the power to be transmitted by the energy converter in a second power range is less than in the first power range, the power to be transmitted by the energy converter being adjusted by means of a combination of the switch-on time and the supplemental switch-off time.

BACKGROUND

In light-emitting diode applications, dimmable front-end devices having a large input and output voltage range are increasingly demanded. Thus, in light-emitting diode applications, an adjustable power range is demanded which distinctly exceeds an adjustable power range of a conventional front-end device for fluorescent lamps. Although there are also front-end devices which can dim various loads to a respective part-power of about 1%, these front-end devices must always additionally provide a basic power for heating the electrical coils of the fluorescent lamps so that converter stages of the front-end devices must always produce a corresponding minimum power which is rarely less than 10% of the design power.

In the case of front-end devices for solid-state lighting (SSL), this is different. In this case, a power range is frequently demanded which is adjustable to up to 100 mW or up to below 1% of the design power. In this context, US 2012/0286686 A1 discloses a lighting facility for a solid-state light source.

SSL front-end devices frequently have energy converters or converters, respectively, which are operated in switching mode, i.e. are clocked. In order to be able to generate the very low powers, the converters are frequently operated at very high frequencies. This causes not only high switching losses but can additionally also cause problems in regard to the electromagnetic compatibility (EMC).

Furthermore, the operation at high frequencies requires power components suitable for this and possibly corresponding circuit measures which are associated with high costs. For this reason, such converters for providing very low powers are operated, for example, in step-up mode or also in step-down mode below a predetermined reference power in a so-called burst mode. The burst mode is characterized by the fact that the converters remain connected for some clock cycles and are thereafter deactivated for a longer period, that is to say a number of clock cycles. The burst mode is found to be disadvantageous in as much as a noise development due to frequencies within the audible range which result from the sequence of burst packets can be the consequence and an intermediate circuit of such a converter can have increased ripple due to the operation following the principle of a 2-point regulator.

In a known embodiment of such a lighting facility, an additional supplemental switch-off time which, for example, is called a pause time, is inserted after a switch-off time given by the complete discharge of an energy storage device. This pause time is inserted after each clock cycle so that the duration of a period of the drive clock is extended.

In particular, the switch-on period of the electronic switching element can be set to a fixed value in a particular power range. During an operation in accordance with such a method, however, compromises can be found with respect to power loss, a constant steady transmission characteristic curve, the accuracy of the output voltage and of the power range in which the lighting facility can be operated in accordance with predetermined boundary conditions. Since light-emitting diodes are light sources having very short response times, special demands are made here on the constancy of the transmitted power. Furthermore, it is of great importance especially for dimming the lighting device that the transmission characteristic curve of the energy converter extends steadily and particularly monotonously so that the transmitted power of the energy converter also follows a change of the predetermined dimming level directly.

SUMMARY

The present disclosure is based on a converter in the form of a clocked electronic energy converter which, for example, can be constructed as single-stage converter circuit. Such an energy converter can be, for example, a step-up converter (boost converter) or also a step-down converter (buck converter).

On this basis, the object of the present disclosure is to develop an energy converter and a method for operating it in such a manner that it can also be used in critical LED applications which set very high demands with regard to a stable operation, for example with regard to flickering, in a wide power range. This object is achieved by a clocked electronic energy converter having the features of the independent patent claim 1. Correspondingly, the present disclosure proposes a lighting device according to the further independent patent claim 5. A method for achieving the object set is given by the features of the independent patent claim 6.

Further advantageous embodiments are the subject matter of the dependent claims.

The present disclosure is based on the finding that in the case of a generic energy converter having at least one energy storage device in a discontinuous operating mode, at the end of each driving phase by the clock generator, due to further parasitic energy-storing elements, an oscillation occurs at the electronic switching element, the phase angle of which, at the time when the electronic switching element is switched on again, is essential for the transfer characteristic of the energy converter. This oscillation is of the greatest significance from two aspects for the operating characteristic, especially at low powers.

On the one hand, the switching losses in the electronic switching element can be reduced to the lowest possible extent only if the switching element is switched on again at the correct time, that is to say the best-suitable phase angle of the parasitic oscillation.

On the other hand, the parasitic oscillation also results in a much more significant influence on the transfer characteristic of the energy converter particularly with regard to dimmable LED applications. With a conventional drive of the electronic switching element with a constant switch-on time, with an energy storage device precharged due to the parasitic oscillation, variation of the supplemental switch-off time results in a change in the initial conditions of the charging state of the energy storage device. If the energy storage device is an inductance, this results in a change in the current time domain and in the case of a capacitor, the voltage time domain correspondingly varies. This effect is enhanced by the fact that an internal switch-off time also rises in dependence on an increasing charging state of the energy storage device. The internal switch-off time is then defined by the time interval between the switching-off of the electronic switching element and the time at which the energy storage device no longer delivers any energy to the system. For example, the internal switch-off time can be determined in the case of an inductance by zero-current detection (ZCD). In consequence of the varying current time domain or voltage time domain, respectively, strong fluctuations can occur in the transmitted power.

By using a constant value for the supplemental switch-off time, which is due to the natural frequency of the electronic circuit, the switch-on time of the electronic switching element can be positioned close to the point for optimum possible switching relief independently of the power currently to be transmitted.

Should one of the two electrical energy storage devices be formed by an inductance, a further positive effect can be achieved if switching is carried out in a minimum or maximum of the electrical voltage which is present across the electronic switching element. In this case, the residual current in the inductance is zero at the time of switching. In this context, switching in the minimum of the electrical voltage is to be preferred, naturally, under the aspect of minimizing losses.

In this context, the value of the supplemental switch-off time can advantageously assume half of the duration of a period of the system-related electrical oscillation over the electronic switching element. Furthermore, the second power range can be followed seamlessly successively by any number of further power range sections, the supplemental switch-off time being constant in each case in each of these power range sections. Advantageously, the supplemental switch-off time is here increased by an integral multiple of a step length from one power range section to the next smaller power range section, the step length being given by the duration of a period of the electrical oscillation present across the electronic switching element. As a result, a monotonous, step-shaped variation can be obtained for the supplemental switch-off time across the power to be transmitted by the energy converter beginning with the first power range over the smaller second power range up to the subsequent power range sections with a continuously reducing power to be transmitted by the electronic energy converter.

The second timer can thus advantageously be designed to provide in at least one further power range, in which the power of the energy converter to be transmitted is less than in the second power range, to provide the supplemental switch-off time of the electronic switching element as constant further value different from zero and from the first value.

In this context, the power range sections mentioned can extend down to the at least power transmittable by the energy converter. However, it may also be provided to keep a smallest power range available in which the determination of the supplemental switch-off time is based on a deviating method.

In an advantageous embodiment, the clock generator is designed to start, on reaching predeterminable energy content of one of the at least two electrical energy storage devices, a new clock cycle which begins with an additional switch-off phase of the electronic switching element having a duration of the supplemental switch-off time, the additional switch-off phase being followed by a switch-on phase of the electronic switching element with a duration of the switch-on time. This results in a repeating sequence of supplemental switch-off time, switch-on time and switch-off time. Reaching a predeterminable energy content of one of the at least two electrical energy storage devices can be given, for example, by a zero transition of a current of an inductance, that is to say when the current changes its direction by the inductance. This condition can be determined, for example, by a suitable circuitry (zero-current detection, ZCD). This results in the advantage that exactly the beginning of the parasitic oscillation across the electronic switching element is determined and correspondingly an exact determination of the optimum re-switch-on time becomes possible.

The first timer can be advantageously designed to carry out the determination of the switch-on time in the second power range, taking into consideration an electrical voltage present at the first terminal and/or an electrical voltage present at the second terminal.

This provides the possibility of determining in dependence on the voltage present at the first terminal or at the second terminal, respectively, the switch-on time in the second power range so that a desired transmission characteristic is obtained. In particular, it may be necessary in a control loop to implement a particular transfer function, for example a linear characteristic. In particular, a monotonic variation of the transfer function may be advantageous for the adjustment of a stable operating point. In this context, the determination of the voltage can take place by a corresponding measuring device. Similarly, a value can be adjusted by a parameter if it is found that a device is operated, for example, only at a 12-V motor vehicle on-board system.

Furthermore, a voltage value can be derived for a voltage present at the first terminal or at the second terminal, respectively, from a nominal value of an external regulator if the external regulator is intended to set the voltage present at the corresponding terminal to the voltage value correlated with the nominal value.

It may also be provided to determine the switch-on time in the second power range not directly but by specifying a comparator threshold from a binary signal determined by comparison from an electrical or magnetic state measured value of an energy storage device of the energy converter. In this context, the comparator threshold can basically have the same variation as a switch-on time to be set directly. Advantageous with such an indirect control of the switch-on time which at the same time develops a protective effect is the improved utilization of the electrical energy storage device. In the case of an inductance, overdriving into the saturation range can be prevented, for example.

Advantageously, the first timer can be designed to determine a voltage wave shape of the electrical voltage present at the first terminal in order to determine the switch-on time in the second power range in dependence on the voltage wave shape determined. Voltage wave shapes under this aspect are, apart from direct voltage, also unipolar voltages generated from an arbitrary alternating voltage, especially alternating voltage without average components, for example having a sinusoidal, rectangular, triangular or trapezoidal variation, generated by rectification, and mixed shapes.

In consequence, the energy converter can be designed to be operated both on a direct voltage and on an alternating voltage, for example 230 V~/50 Hz, the first timer being able to be designed to distinguish it between a direct-voltage operation (DC) and an alternating-voltage operation (AC) and to apply, in dependence on the AC/DC distinction a respectively suitable method for determining the supplemental switch-off time, for example in the form of a respectively optimized calculating rule. This results in the advantage that the energy converter can have a comparable transmission characteristic even when fed with different voltage wave shapes without intervention into the energy converter being required. In this context, the transmission characteristic is given by the correlation between the first signal which controls both the first timer and the second timer, and the power transmitted by the energy converter.

On the side of the method, a change from the first power range into the second power range can then be executed advantageously when the switch-on time in the first power range drops below the value of a predeterminable minimum switch-on time. By means of the extended switch-on time and the supplemental switch-off time additionally used, a lower operating frequency can be implemented. The value of the minimum switch-on time can then be determined in dependence on the electrical voltage present at the first terminal and/or the electrical voltage present at the second terminal. In particular, it can be provided to determine the value of the minimum switch-on time directly in dependence on the electrical voltage present at the second terminal.

By means of a simultaneous, aligned change of the switch-on time and the supplemental switch-off time during the change from the first power range into the second power range, a steady transition of the power transmitted by the energy converter can take place, particularly without kinks or jumps. In this context, it can be provided that the change back from the second power range into the first range is carried out with a hysteresis as a result of which a permanent change between the two ranges is avoided. By this means, permanent jumping back and forth between the two power ranges with corresponding variation of the power transmitted by the energy converter can also be avoided, especially in the case of an unsteadiness given by technical restrictions, of the transfer characteristic curve of the power transmitted by the energy converter in dependence on the first signal, for example by limited resolution for the switch-on time or of the supplemental switch-off time with implementation in a discretely operating system. Such a repetitive change of range could have a disadvantageous effect on the stability of the generated light especially when using an LED as connected load.

In this context, with a continuous increase in power with a change from the second power range into the first power range, a value for the switch-on time which is distinctly greater than the minimum switch-on time is suitably set on entry into the first power range.

Furthermore, it can be provided that in a third power range, in which the power to be transmitted by the energy converter is less than in the second power range, the power to be transmitted by the energy converter is adjusted by means of a constant switch-on time and by means of a supplemental switch-off time increasing with decreasing power. In this context, the third power range does not mandatorily need to be joined directly to the second power range. Instead, it can also be provided that between the third power range and the second power range at least one further power range is inserted in which another control method, advantageously of the type of control method as it is used in the second power range is executed. Such a method can be used particularly advantageously in the case of such an energy converter in which the parasitic electrical oscillation across the electronic switching element is greatly attenuated.

In a development according to the present disclosure of the aforementioned method, the supplemental switch-off time can be specified as constant and greater than the supplemental switch-off time in the second power range, in a fourth power range in which the power to be transmitted by the energy converter is less than in the second power range and greater than in the third power range. In particular, the fourth power range can then adjoin the second power range directly. Furthermore, the fourth power range and the third power range can adjoin one another directly. However, it can also be provided to insert between the fourth power range and the third power range an arbitrary number of further power ranges in which in each case an increasing constant supplemental switch-off time is set in each case with decreasing power to be transmitted by the energy converter in the respective power range.

In an advantageous development of this method, the supplemental switch-off time can be increased by a predeterminable value in the case of a change from the second power range into the fourth power range and the supplemental switch-off time reduced by the predeterminable value in the case of a change from the fourth power range into the third power range. In this context, the setting of the predeterminable value to a duration of a period of the electrical oscillation present at the electronic switching element is particularly advantageous. As a result, the switching element is switched on again in the same phase angle of the parasitic oscillation in the case of an extension of the supplemental switch-off time. Thus the switching process takes place again in the optimum for the best possible switching relief of the electronic switching element and in the preferred state of the energy storage device of one of the two energy storage devices even with extended supplemental switch-off time as a result of which a uniform energy transmission is ensured.

Due to the fact that the switching processes act on the same initial state of the said energy storage devices in both power ranges, that is to say the second power range and the fourth power range, the course of the power to be transmitted in the transition from the second power range into the fourth power range can be formed to be constant.

In a particularly advantageous embodiment of the method according to the present disclosure, the switch-on time in the second power range can be determined in dependence on a first signal, by means of which a power of the energy converter to be transmitted is set in such a manner that the power to be transmitted depends on the first signal in the same manner as if the power to be transmitted were to be controlled analogously to the first power range. The boundary between the first power range and the second power range is then determined indirectly via the specification of the minimum switch-on time. The aforementioned adjusting rule for the switch-on time is equivalent to the demand for an identical transfer characteristic from the lower power limit of the second power range to the upper limit of the first power range independently of the dimensioning of the switch-on time. The latter means nothing else than extending the first power range to the second power range in such a manner that the second signal generated from the first signal by the first timer is not corrected toward a greater value and the third signal generated from the first signal by the second timer represents a supplemental switch-off time of zero. The comparative consideration corresponds to a parameterization of the first timer and of the second timer, with a minimum switch-on time of zero which is equivalent to the disappearance of the second power range which is completely realized within the first power range.

For the special case that the first timer forwards the first signal, directly as the second signal and possibly corrects the second signal to the higher value for the switch-on time so that the second signal can never become smaller than the minimum switch-on time, the first signal can be considered as fictitious switch-on time in the second power range. Thus, the determination of the switch-on time is to be carried out in such a manner that the same power transmission of the energy converter is obtained as if the fictitious switch-on time were to be provided directly to the clock generator and no supplemental switch-off time were to be inserted. Applying this method for determining the switch-on time mandatorily results in transition from the first power range into the second power range in a steady and smooth curve which characterizes the relationship between the first signal and the transmitted power of the energy converter, that is to say the curve has no kink when reaching the switch-on time boundary.

In a particularly advantageous embodiment of the method according to the present disclosure, a continuous changing of the power to be transmitted associated with a change of the power range can produce a stepless changing of the power transmission of the energy converter. By this means, irregularities in the transfer function can be avoided, in particular, which is particularly advantageous for the use of a superimposed control loop. It is of the greatest significance especially in the case of light applications that the transfer function of the energy converter is as smooth as possible and without distinct jumps in order to avoid an elaborate correction of the transmitted power.

In a preferred embodiment of the method according to the present disclosure, the switch-on time in the second power range can be determined with consideration of a constant voltage amplitude and a constant curve shape for an electrical voltage of an energy source connected to the energy converter and an electrical voltage provided by the energy converter for a load connected to the energy converter in such a manner that the switch-on time depends exclusively on the power to be transmitted. This measure allows that determining the switch-on time in the second power range can be considerably simplified. By this means, a very fast determination of the switch-on time in the second power range can be implemented and, in addition, a particularly simple control or regulation, respectively, of the energy converter can be achieved in operation in the second power range.

For example, it can be provided that steady-state conditions having a constant value are equivalent for the electrical voltage of the energy source connected to the energy converter, the constant value for the electrical voltage possibly being an average, an effective value or the like. In addition, the value can be adapted by means of a factor in order to achieve a reliable operation and a reliable calculation of the switch-on time in the second power range. Basically the same applies to the electrical voltage provided by the energy converter.

In addition, it is proposed that an alternating voltage is applied to the energy converter at its input and it is controlled in such a manner that an input power factor is maximized. This allows reactions to the energy source, which is an alternating-voltage source in this case, to be reduced. In particular, this feature can be designed as power factor control or power factor regulation (PFC), respectively.

In a preferred development, the switch-on time and/or the supplemental switch-off time can be specified as constant with a constant power to be transmitted by the energy converter within a half or complete period of the alternating voltage used at the input end. By this means, the same simple control structure is obtained as in the case of a direct voltage, only the method for determining the second signal representing the switch-on time as a function of the first signal in the second power range differs from the case of a direct voltage present in each case at the first terminal and at the second terminal. Advantageously, the second signal can then be determined from the first signal during the operation with the aid of a table of values instead of an elaborate calculation.

In particular, the table can be constructed to be nonlinear, functional areas having few changes being backed by support points at relatively great distances and functional areas having strong changes being backed by support points at narrower distances. Intermediate values can then be obtained with good accuracy in a simple manner by interpolation.

BRIEF DESCRIPTION OF THE DRAWINGS

Further advantages and features can be found in the exemplary embodiments presented in the description following. In the figures, identical reference symbols designate identical features and functions.

In the drawings, like reference characters generally refer to the same parts throughout the different views. The drawings are not necessarily to scale, emphasis instead generally being placed upon illustrating the principles of the disclosed embodiments. In the following description, various embodiments described with reference to the following drawings, in which.

DETAILED DESCRIPTION

A generic energy converter can be basically operated in different operating modes, for example in a continuous mode, a transition mode, a discontinuous mode and a burst mode. In particular, the transition mode may be present in the first power range, that is to say operation at a gap boundary at which, for example, the current just becomes zero in an energy storage device constructed as inductance. In the second range, the discontinuous mode is then present, that is to say the energy converter then operates in gapped mode.

Figure 1:
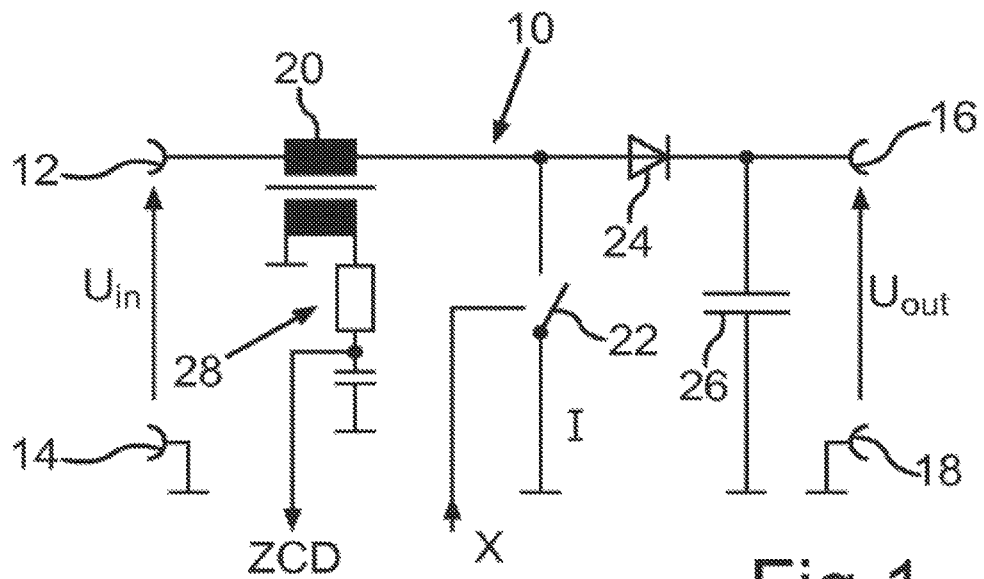
FIG. 1 shows a basic circuit diagram for a clocked electronic energy converter according to the present disclosure as step-up converter.

An energy converter of the generic type is shown diagrammatically in FIG. 1 as circuit diagram with regard to its basic circuit. FIG. 1 shows a clocked electronic energy converter 10 as step-up converter with an input terminal which has terminal clips 12, 14 between which an input voltage $U_{in}$ of an energy source, not shown, is present. In addition, the energy converter 10 has an output terminal with connecting terminals 16, 18 between which an output voltage $U_{out}$ for an electrical energy sink, not shown, is present. The connecting terminal 14 and the connecting terminal 18 are electrically conductively connected to one another and presently form an electrical reference potential. The input voltage $U_{in}$ and the output voltage $U_{out}$ are thus not separated electrically. In the case of alternative circuit topologies, an electrical isolation between the connecting terminals 12 and 14 and the connecting terminals 16 and 18 can be provided. However, this is not essential for the principle of the present disclosure.

The connecting terminal 12 is connected to a first terminal of an inductance 20 which is connected with its second terminal to an electronic switching element, in this case a MOSFET 22, and to an anode of a diode 24. The MOSFET 22 is connected with its drain terminal to the inductance 20. Its source terminal is connected electrically conductively to the connecting terminals 14 and 18.

A cathode of the diode 24 is connected to a first terminal of an intermediate-circuit capacitor 26 which, in turn, is connected to the connecting terminal 16. The intermediate-circuit capacitor 26 is connected with its second terminal to the connecting terminals 14 and 18. The output voltage at the connecting terminals 16, 18 thus corresponds to the intermediate-circuit voltage at the intermediate-circuit capacitor 26.

Furthermore, the inductance 20 is coupled magnetically to a detection unit 28 by means of which it can be determined when the inductance 20 no longer contains any energy. The detection unit 28 has a terminal, not designated, for a signal ZCD (zero-crossing detection) which is supplied to a control unit 30 (FIG. 14), not shown in this figure. The control unit 30 also supplies a signal X which is supplied to a gate terminal of the MOSFET 22 by means of which the MOSFET 22 can be operated in switched mode.

Figure 2:
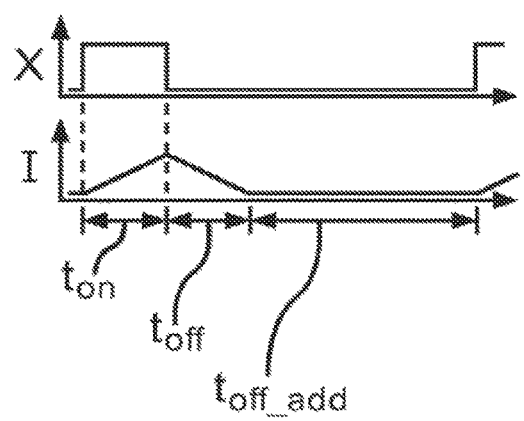
FIG. 2 shows two diagrams which represent diagrammatically a signal pattern for driving the circuit according to FIG. 1.

FIG. 2 shows in two diagrams schematic signal variations which represent an operation in the second power range. From the upper diagram of FIG. 2 it can be seen that the signal X which is present at the gate terminal of the MOSFET 22 switches the MOSFET 22 on only for a comparatively short period, namely the switch-on time $t_{on}$ which in this case can be equal to a minimum switch-on time $t_{on\_min}$. In this period, the current I through the inductance 20 rises essentially linearly which can be seen from the second lower diagram of FIG. 2.

At the end of the switch-on time $t_{on}$ defined by the signal X, the MOSFET 22 is switched off and the current I through the inductance 20 increases up to the value zero which is characterized with the switch-off time $t_{off}$ in the second lower diagram of FIG. 2.

In transition mode, a new cycle having a new switch-on time $t_{on}$ of the signal X would now follow if a power is to be set in the first power range. In FIG. 2, however, a power is to be set which is in the second power range. From US 2012/0286686 A1, it is known to keep the switch-on time $t_{on}$ constant in the second power range.

At the same time, a supplemental switch-off time $t_{off\_add}$ is inserted in this operating state which follows the switch-off time $t_{off}$. After the supplemental switch-off time $t_{off\_add}$ has elapsed a new switch-on cycle takes place.

Figure 3:
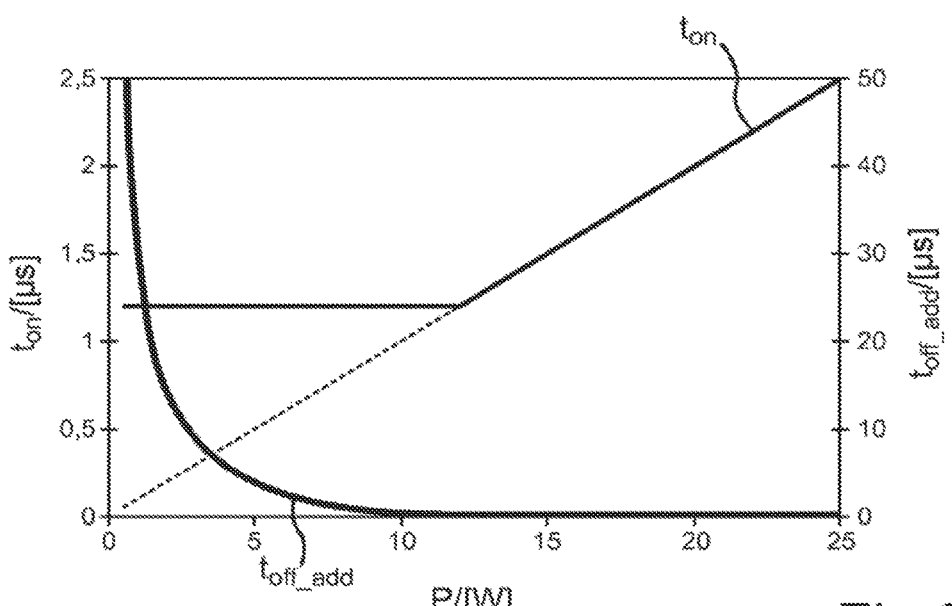
FIG. 3 shows a diagram which diagrammatically shows graphics which, by way of example, represent the variation of the switch-on time and the supplemental switch-off time in dependence on a power to be transmitted by the energy converter.
Figure 4:
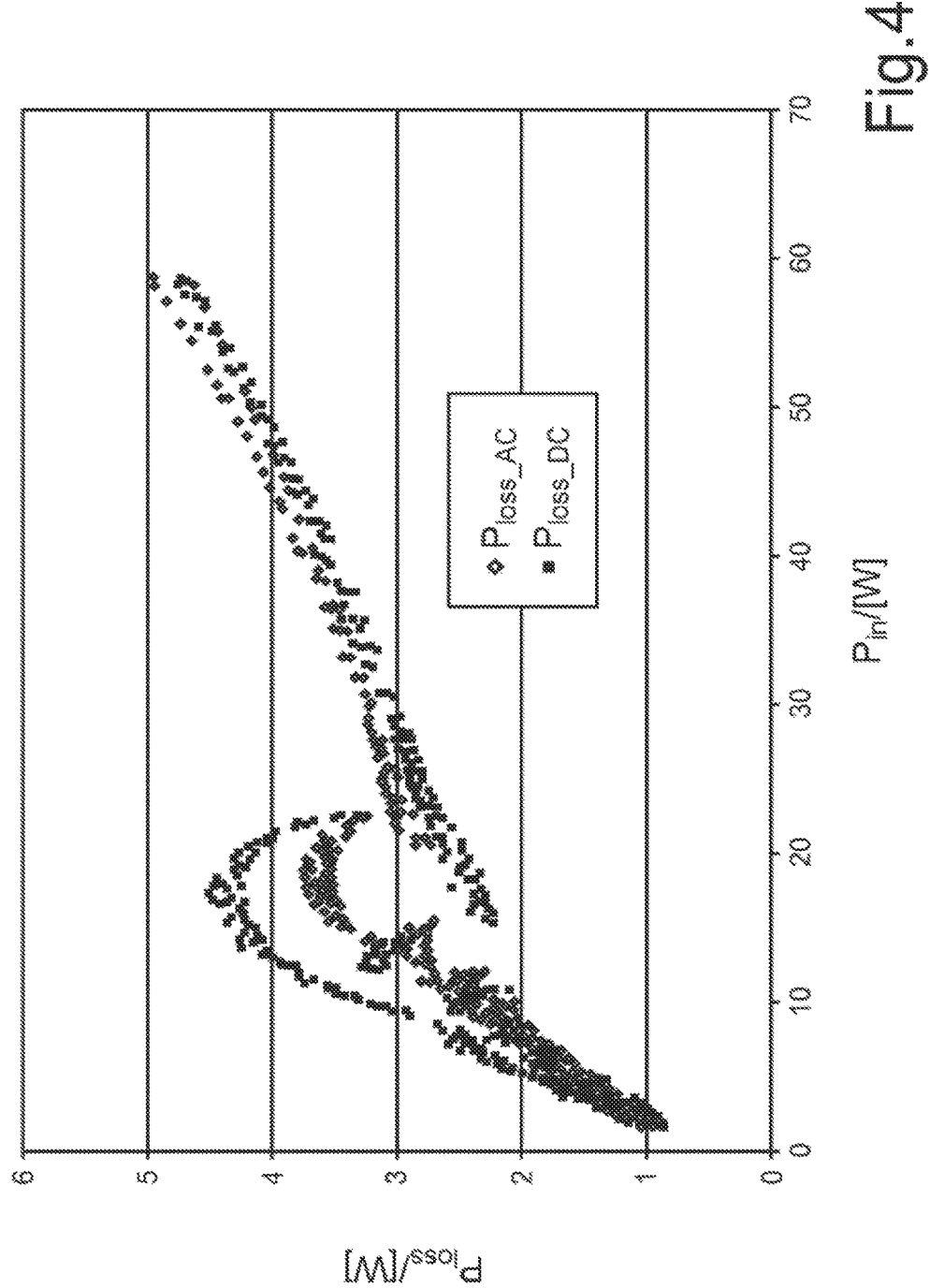
FIG. 4 shows a diagram with two graphs which specifies the power loss of a sample device in dependence on the entire power absorbed both for alternating-voltage and for direct-voltage supply.

FIG. 3 shows a diagram in which two graphs are shown diagrammatically which represent the variation of the switch-on time $t_{on}$ of the electronic switching element of the energy converter and the supplemental switch-off time $t_{off\_add}$ in dependence on a power P to be transmitted by the energy converter. In this context, the switch-on time $t_{on}$ is reduced with decreasing power P to be transmitted by the energy converter until it reaches the value of the minimum switch-on time $t_{on\_min}$ which is set at 1.2 μs, for example, in the diagram. In the present example, the limit of the power P to be transmitted by the energy converter between the first power range and the second power range is 12 W. The continuation of the switch-on time $t_{on}$ in the second power range, assuming non-limitation, is indicated dashed. To achieve a transfer characteristic of the electrical energy to be transmitted by the energy converter in the second power range with a preset switch-on time $t_{on}$, which should be exactly identical as in the case of control with an unlimited switch-on time $t_{on}$ according to the line continued dashed, a supplemental switch-off time $t_{off\_add}$ is to be introduced which can have the variation shown in the diagram. This is 0 μs particularly in the first power range and increases continuously, starting from the boundary of the first power range, toward the second power range with decreasing power P. For example, the power is here scaled from 0 W to 25 W and a subdivision in 5 W-steps, on the left-hand ordinate, the switch-on time $t_{on}$ is plotted in μs between 0 μs and 2.5 μs in steps of 0.5 μs, the supplemental switch-off time $t_{off\_add}$ is plotted at the right-hand vertical axis in the range from 0 μs to 50 μs with scale mark labelings at intervals from 10 μs. The present diagram is only used for illustrating the operating method, particularly, the selected parameters are not obligatory for the statements following.

A measurement of the efficiency at a sample device which is operated in accordance with the aforementioned method, at various input powers $P_{in}$ in each case in alternating-voltage (AC-) and direct-voltage (DC-) mode discloses a weak point in the concept in operation with a continuously increasing supplemental switch-off time $t_{off\_add}$. An increase of the losses in the power range between 10 W and 23 W can be found. A set of measurement values of the power loss of a complete electronic front-end device (FED) which contains a step-up converter with power factor correction at the input and a step-down converter at the output are shown in dependence on the input power at the input of the electronic front-end device. In this context, measurement values in DC mode $P_{loss\_DC}$ are symbolized with squares filled in and measurement values in AC mode $P_{loss\_AC}$ with rhombuses not filled in. The input power $P_{in}$ is here scaled within a range from 0 W to 70 W, scale mark labelings being entered at intervals of 10 W. Furthermore, the power loss $P_{loss}$ is plotted at the ordinate within a range from 0 W to 6 W, the scale mark labelings being entered at intervals of 1 W. Application of the control principle with continuously increasing supplemental switch-off time $t_{off\_add}$ shows an increased power loss in the part-load range. The range between approx. 1.5 W input power $P_{in}$ and approx. 60 W input power $P_{in}$ is occupied with measurement values. In the case of input powers $P_{in}$ of greater than approx. 22 W, an approximately linear relationship can be observed between the input power $P_{in}$ and the power loss $P_{loss}$. With a lower input power $P_{in}$, a distinct bulging out of the power loss $P_{loss}$ toward greater values can be noted, in the extreme case, approx. 15 W input power $P_{in}$ results in approx. 4.3 W power loss $P_{loss}$ instead of 2.2 W to be expected with approximately linear continuation. With further reduced power in the range of less than approx. 10 W input power $P_{in}$, an increased approximation of the variation to be expected theoretically takes place again. In this context, the additional losses mainly occur at the step-up converter. This has been checked by temperature measurement at the MOSFET 22 of the step-up converter.

Figure 5:
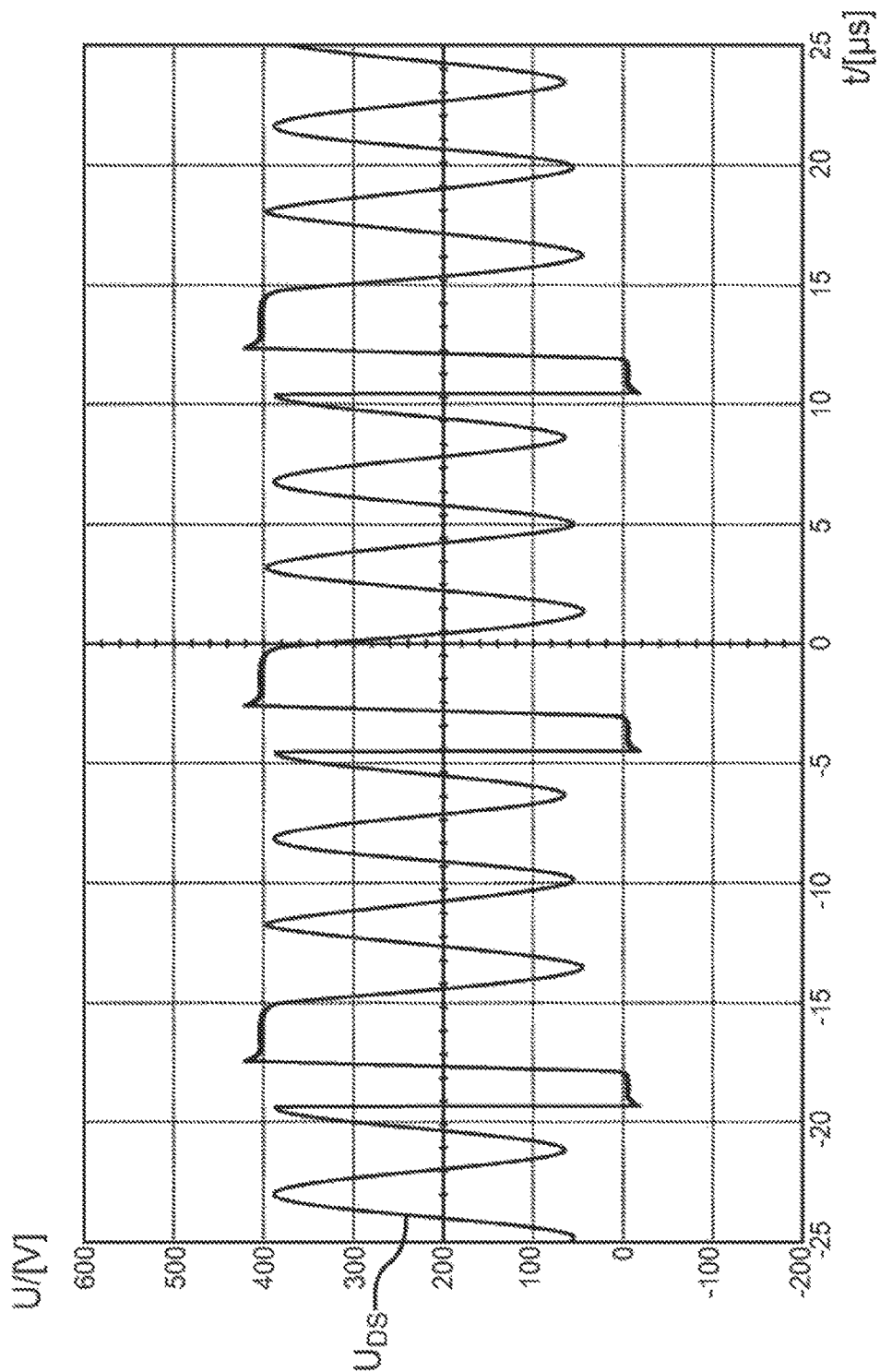
FIG. 5 shows the drain-source voltage measured at a sample device with repeated hard switch-on with an additional dead time of approx. 10 μs.

In the discontinuous mode, that is to say in the gapped operation of the current for the inductance 20, the voltage across the electronic switching element oscillates in the actually available form of the MOSFET 22, after switching-off, at a frequency which results from the capacitance of the MOSFET 22 switched off, of the diode 24 and the inductance value of the inductance 20. FIG. 5 shows the exemplary variation of a drain-source voltage measured across the MOSFET 22 with a horizontal division of 5 μs per scaling section drawn and a vertical division of 100 V per scaling section drawn. The curve shape shows here a repeated hard switch-on with an additional supplemental switch-off time $t_{off\_add}$ of approx. 10 μs. Hard switch-on means in this context that the switching-on occurs at a time at which the voltage across the drain-source link of the MOSFET 22 is close to the previously present maximum voltage. The effective capacitance which results from the capacitance of the disconnected MOSFET 22 and further parasitic capacitances of the surrounding components is in this case abruptly discharged by the MOSFET 22 switching on and the energy contained therein is converted into heat dissipation in the MOSFET 22. For the oscillation, the following physical conformities apply: the frequency is obtained from the capacitance of the disconnected MOSFET 22, the diode 24 and the inductance value of the inductance 20. The maximum amplitude of the oscillation results from the difference of the output voltage $U_{out}$ and input voltage $U_{in}$, the mean value of the oscillation corresponds to the input voltage $U_{in}$. Depending on input voltage $U_{in}$ and output voltage $U_{out}$, three cases relevant for the power loss $P_{loss}$ can be distinguished.

Figure 6:
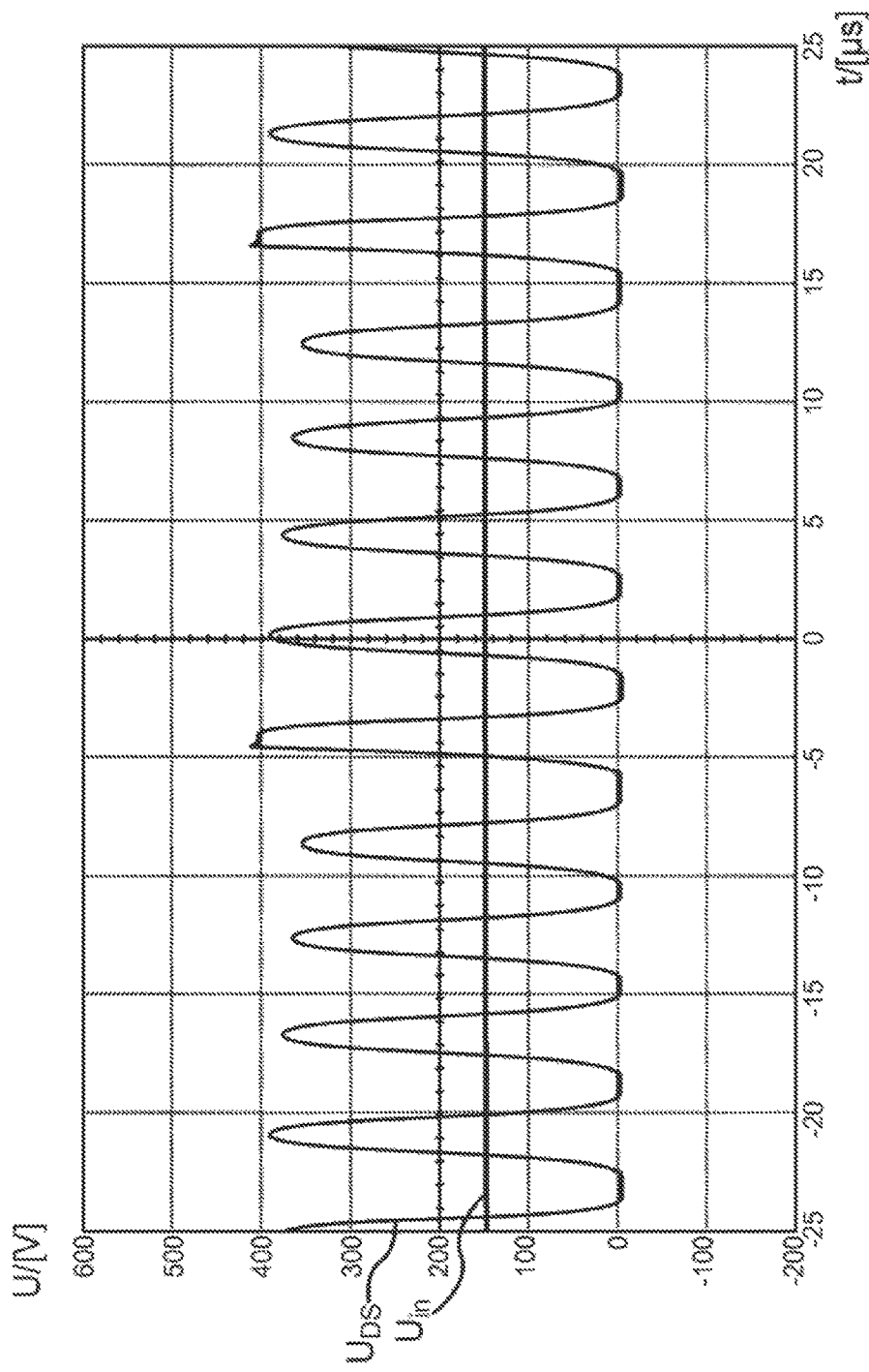
FIG. 6 shows the drain-source voltage measured at a sample device having a first input voltage.

FIG. 6 shows the voltage variation of an oscillation across the MOSFET 22, the input voltage $U_{in}$ being smaller than half the output voltage $U_{out}$ which represents an intermediate-circuit voltage in this case. In this context, the input voltage $U_{in}$ is 150 V, the output voltage $U_{out}$ is 400 V. The oscillation again reaches the 0 V-limit with each minimum. As a result, a switch-relieved operation in the form of the so-called zero-voltage switching (ZVS) of the MOSFET 22 becomes possible.

Figure 7:
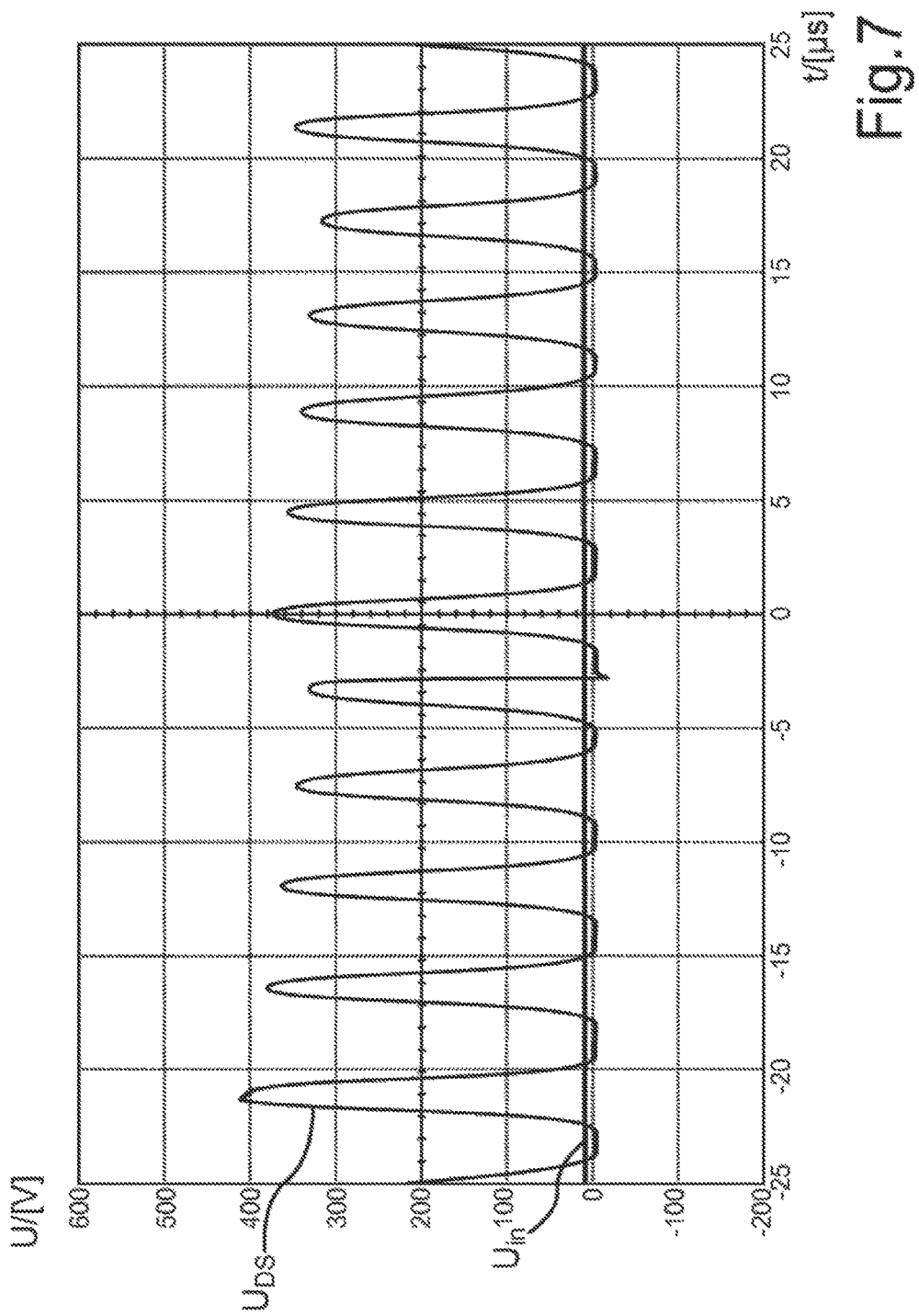
FIG. 7 shows the drain-source voltage measured at a sample device having a second input voltage.

FIG. 7 shows the variation of the drain-source voltage at the MOSFET 22 with an input voltage $U_{in}$ equal to 11 V. In the case of a very small input voltage as in the case shown, the voltage is clamped to 0 V at the minimum of the oscillation. As a result, the range in which relieved switching is possible becomes wider. Clamping the voltage to 0 V then occurs by the antiparallel body diode integrated in a MOSFET due to its type.

This means that the ranges in which it comes to high switching losses due to an unfavorably selected supplemental switch-off time $t_{off\_add}$ become fewer or more improbable, respectively. Nevertheless, higher switching losses are still possible at individual points. However, these points are encountered with less probability.

Since a higher-level PFC controller operates permanently and there are thus small changes of the settings time and again, a statistical consideration appears to be permissible for the analysis.

Figure 8:
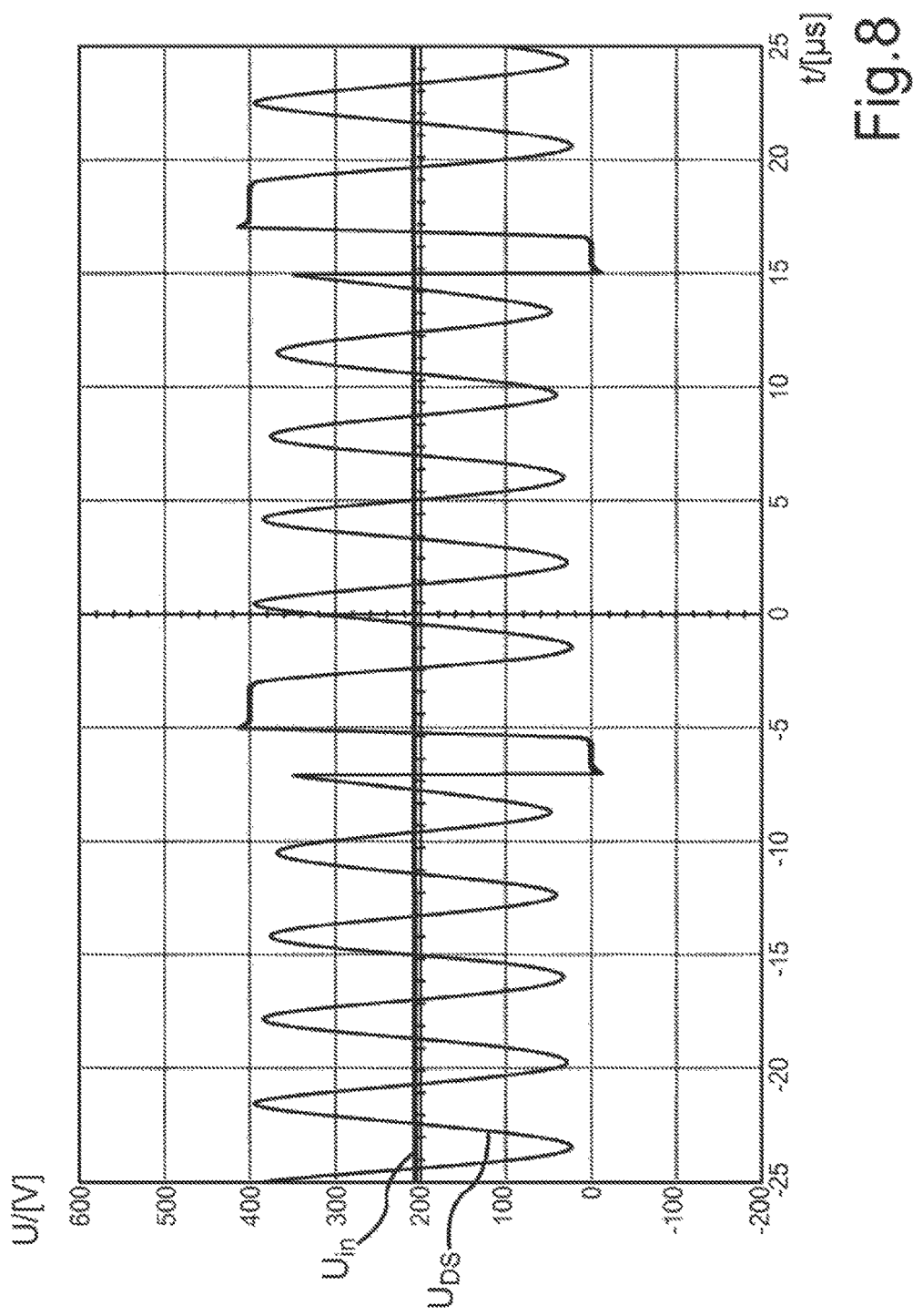
FIG. 8 shows the drain-source voltage measured at a sample device having a third input voltage.

FIG. 8 shows the same voltage variation with an input voltage $U_{in}$ which is greater than half the output voltage $U_{out}$ but is distinctly less than the output voltage $U_{out}$ itself. In the present example, the input voltage $U_{in}$ is 207 V, the output voltage $U_{out}$ is 400 V. The voltage across the drain-source link of the MOSFET 22 here already oscillates back again without reaching the value of 0 V. Switching relief is still largely possible but the switching time must occur at the correct time, that is to say when the voltage just assumes its minimum. The energy stored in the effective capacitances is then minimum which is converted into heat dissipation in the MOSFET 22 during the following switching-on process. In contrast, FIG. 8 shows a switching-on process at a particularly disadvantageous time at which the voltage across the drain-source link of the MOSFET 22 has almost reached the full voltage again. Since the energy in a capacitor increases with the square of the voltage present, a particularly large amount of energy is here converted into energy loss.

Figure 9:
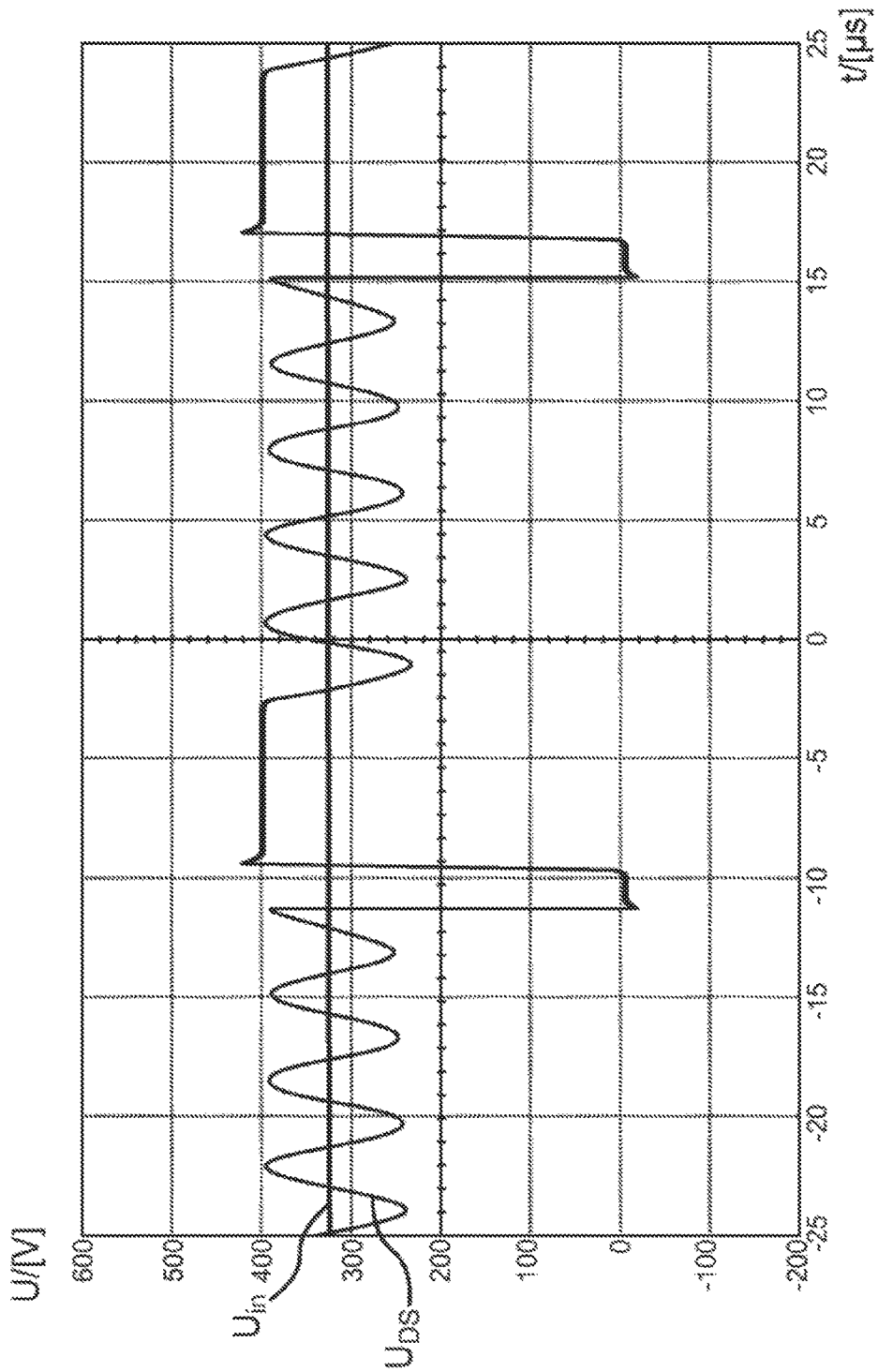
FIG. 9 shows the drain-source voltage measured at a sample device having a fourth input voltage.

When the value of the input voltage $U_{in}$ is close to the value of the output voltage $U_{out}$, the difference of the two voltages is insufficient for generating an amplitude which is large enough to provide relieved switching. FIG. 9 here shows an exemplary voltage variation across the drain-source link of the MOSFET 22 with an input voltage $U_{in}$ equal to 328 V and an output voltage $U_{out}$ equal to 400 V. This operation can occur for example, with a feeding with alternating voltage at the crest of the 230 V alternating voltage. Due to the limited polarity reversal, the voltage across the MOSFET 22 can only be reduced so insignificantly that an effective switching relief is not given even at the optimum switching time. The energy loss implemented in AC mode in the MOSFET 22 is not so critical, however, since the switching frequency is relatively low.

Figure 10:
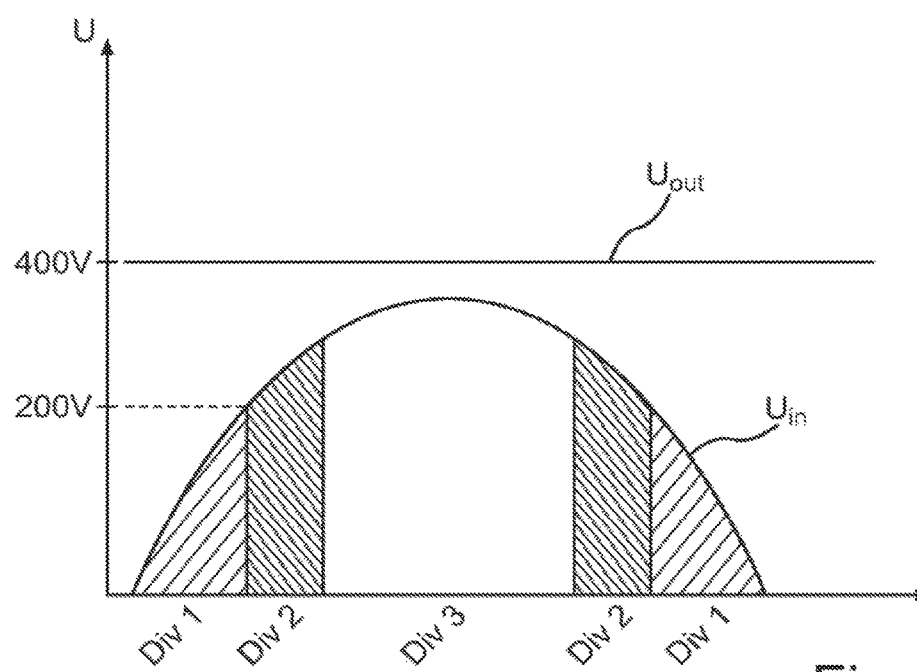
FIG. 10 shows a diagrammatic subdivision of a sinusoidal half wave in areas having different oscillation characteristics of the voltage variation at the electronic switching element.

These three operating cases characterized above are shown in FIG. 10. The diagram shows a schematic subdivision of a sinusoidal half wave into areas having different oscillation characteristics of the voltage variation of the electronic switching element which is given by the MOSFET 22. On the abscissa, the time t is plotted without scaling, on the ordinate the voltage $U_{in}$ is plotted in V with markings of 200 V and 400 V. The value of the intermediate circuit voltage which is equal to the output voltage $U_{out}$ equal to 400 V is shown dashed. The sinusoidal half wave is shown as part of a 230 V alternating voltage. The first area Div1 is identified by the fact that the voltage $U_{in}$ is less than 200 V. The first area Div1 is arranged immediately before or after a zero transition of the system voltage from which the input voltage $U_{in}$ is obtained via rectification. The first two areas Div1 are in each case adjoined directly by a second area Div2 in which the input voltage $U_{in}$ is greater than 200 V, that is to say one half of the output voltage $U_{out}$ is equal to 400 V, the in each case second area Div2 extending up to an input voltage $U_{in}$ at a level of approx. 300 V. This boundary is selected here arbitrarily and is only used for better representation of the grouping. Between the two second areas Div2, a third area Div3 is arranged which extends over the crest of the system voltage or, respectively, the maximum of the rectified input voltage $U_{in}$ in each case from one to the other second area Div2. In the course of a sinusoidal half wave, the operating case according to the second area Div2 therefore only occurs for a brief time. If, in contrast, a DC voltage of constant 230 V is assumed, it can be seen why most of the losses occur at DC. The step-up converter here runs continuously in the second area Div2 in which the highest losses are produced.

To optimize the power loss it is desirable to switch the MOSFET 22 on again when the voltage across the drain-source link has a minimum because the energy stored in the effective capacitance increases as a square of the voltage applied. In the subsequent switching-on process of the MOSFET 22, this is converted completely into heat dissipation in the MOSFET 22 and impairs the efficiency of the electrical energy converter 10 distinctly, particularly with low and lowest powers to be transmitted.

Figure 11:
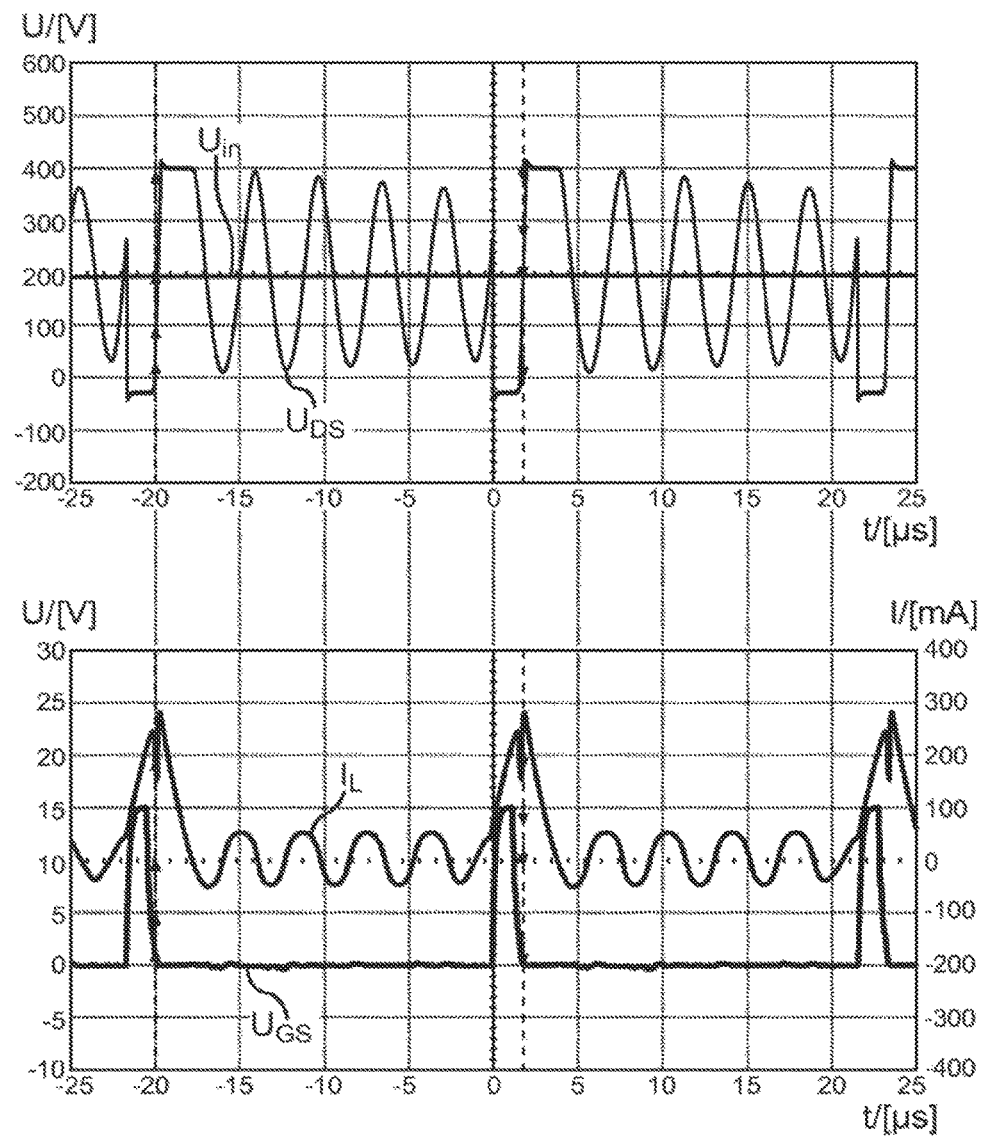
FIG. 11 shows current and voltage variations measured at a sample device, the electronic switching element being switched on approximately in the maximum of the current through an inductance.

But even if the power loss does not need to be considered, no arbitrary switch-on time should be chosen since the current $I_L$ in the inductance 20 plays an important role at the switch-on time. The current $I_L$ through the inductance 22 is shifted in phase by 90° with respect to the drain-source voltage $U_{DS}$ which is present across the drain-source link of the MOSFET 22. FIG. 11 shows the variation of the current $I_L$ in the inductance 20, the variation of the drain-source voltage $U_{DS}$ and input voltage $U_{in}$ and a gate-source voltage $U_{GS}$ which is used for driving the MOSFET 22. The MOSFET 22 is here switched on at the point in which the line of the drain-source voltage $U_{DS}$ just intersects the line of the input voltage $U_{in}$ which, at the same time, represents the mean value of the freely oscillating drain-source voltage $U_{DS}$ and can thus be considered as reference line for a "zero transition". The current $I_L$ in the inductance 20 is at this time of free oscillation just maximum and the peak value of $I_L$ that is occurring in the subsequent switching-on interval is correspondingly high.

Figure 12:
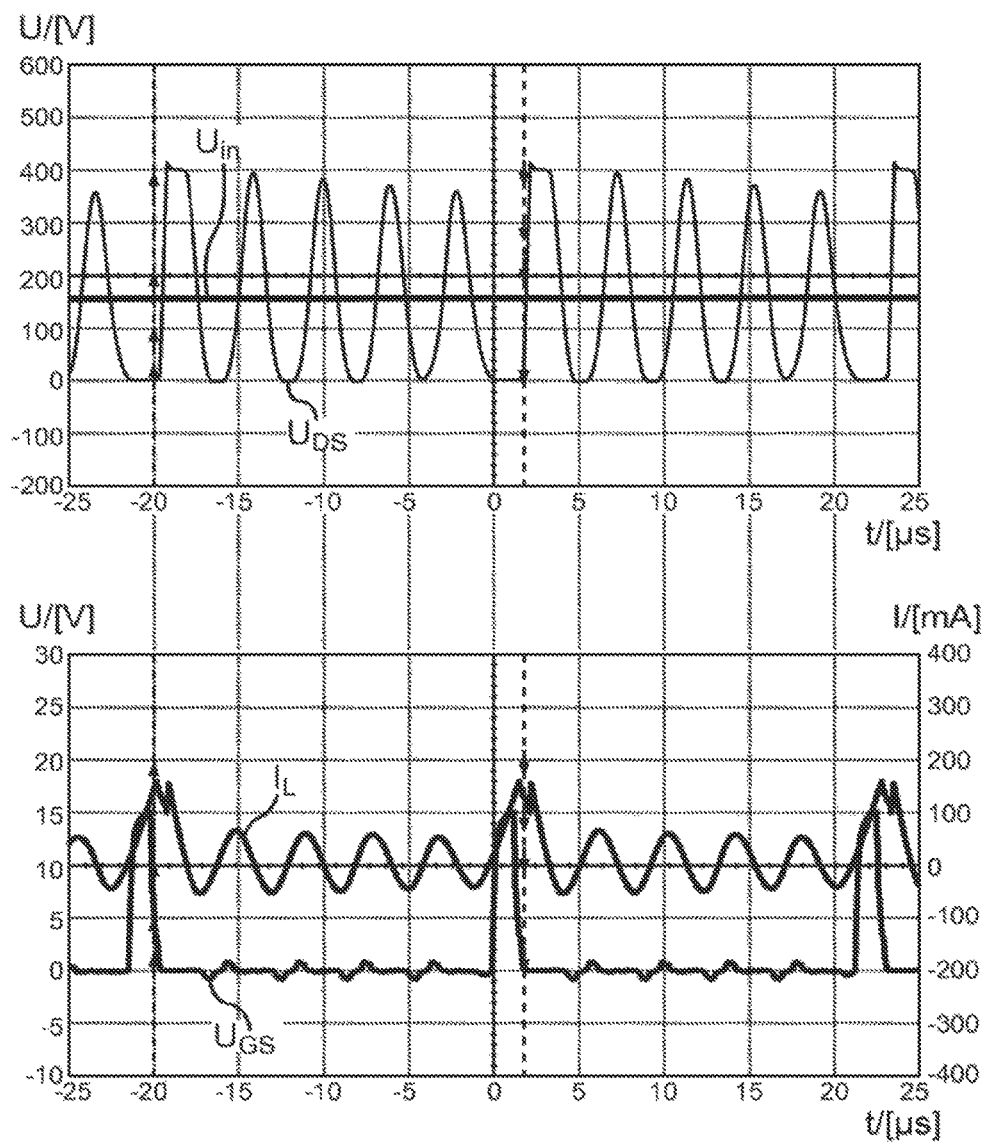
FIG. 12 shows current and voltage variations measured at a sample device, the electronic switching element being switched on approximately in the zero transition of the currents through an inductance.

FIG. 12 shows the same measuring curves as FIG. 11 but the MOSFET 22 is here switched on at a different time, namely in the voltage minimum of the drain-source voltage $U_{DS}$ of the MOSFET 22. In this case, the current in the inductance 20 is nearly 0 A. This is an optimum switching process. If, therefore, switching occurs in a minimum or maximum of the drain-source voltage $U_{DS}$ of the MOSFET 22, the residual current in the inductance 20 is 0 A.

The absolute magnitude of the current $I_L$ is here relatively low during the freely oscillating phase. However, this current acts as offset for the actual current through the inductance 20. This applies precisely when the energy converter is operated with constant switch-on time $t_{on}$. This is normal with microcontroller-controlled converters, especially when they are used for power factor correction (PFC). The technical expenditure is less since no comparator reference threshold for checking the PFC condition needs to be corrected. In this configuration, the offset of the current through the inductance has a strong effect on the mean current through the inductance 20 and thus also on the transmitted power of the converter. The offset is a genuine offset, that is to say there is a linear superimposition of the actual current through the inductance 20. This also changes the peak current in the inductance 20. In operation at the gap boundary or in gapped mode, the higher peak current also prolongs the duration of the free running phases and thus the current time domain.

It is especially in the lower power range of the power to be transmitted by the energy converter that the offset in the current $I_L$ of the inductance 20 can change the power by such an amount that a higher-level regulator has to respond. In this context, it cannot be excluded that the transfer function of the energy converter is no longer monotonic in some areas. In this case, the regulator can oscillate between two operating points.

Figure 13:
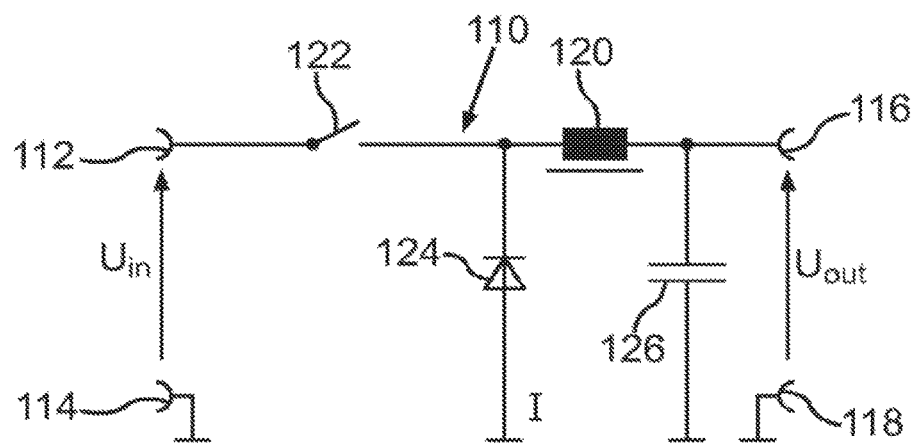
FIG. 13 shows a basic circuit diagram for a clocked electronic energy converter according to the present disclosure as step-down converter.

FIG. 13 shows a clocked electronic energy converter 110 as step-down converter with an input terminal which has connected terminals 112, 114 between which an input voltage $U_{in}$ of an energy source, not shown, is present. In addition, the energy converter 20 has an output terminal with connecting terminals 116, 118 between which an output voltage $U_{out}$ for an electrical energy sink, not shown, is present. The connecting terminal 114 and the connecting terminal 118 are electrically conductively connected to one another and form presently an electrical reference potential. The input voltage $U_{in}$ and the output voltage $U_{out}$ are thus not electrically isolated. In the case of alternative circuit topologies, an electrical isolation can be provided between the connecting terminals 112 and 114 and the connecting terminals 116 and 118. However, this is not essential for the principle of the present disclosure.

The connecting terminal 112 is connected to a first terminal of an electronic switching element, in this case to the drain terminal of a MOSFET 122. A second terminal of the electronic switching element, in this case the source terminal of the MOSFET 122, is connected to a first terminal of an inductance 120 and to the cathode of a diode 124. The anode terminal of diode 124 is connected electrically conductively to connecting terminals 114 and 118.

The second terminal of inductance 120 is connected to a first terminal of a capacitor 126 which, in turn, is connected to connecting terminal 116. Capacitor 126 is connected with its second terminal to connecting terminals 114 and 118. The output voltage at connecting terminals 116, 118 thus corresponds to the voltage at capacitor 126.

In gapped mode there is a significant difference between an electrical energy converter 110 in its configuration as step-down converter according to the arrangement in FIG. 13 and an electrical energy converter 10 in the embodiment as step-up converter according to FIG. 1. The oscillation forming is attenuated only very weakly in the case of the step-up converter. In the case of the step-down converter, in contrast, the oscillation is greatly attenuated because the oscillation takes place on the side of the load and is attenuated by it.

For the step-up converter, the abovementioned findings mean that an optimum state is achieved only when the additional supplemental switch-off time $t_{off\_add}$ is raised in steps in such a manner that the switching times are always located at the voltage minima. In the example following, these are approx. 3.5 µs. In this context, attention must always be paid to the fact, however, that the transfer function only has the smallest possible steps and behaves monotonically. To achieve this, it is proposed, therefore, when extending the additional supplemental switch-off time $t_{off\_add}$, at the same time to enlarge the switch-on time $t_{on}$ in order to keep the jump in the transfer function minimal. This plays a role mainly during the first insertion of an additional supplemental switch-off time $t_{off\_add}$ since the power jump is otherwise very large here.

Figure 14:
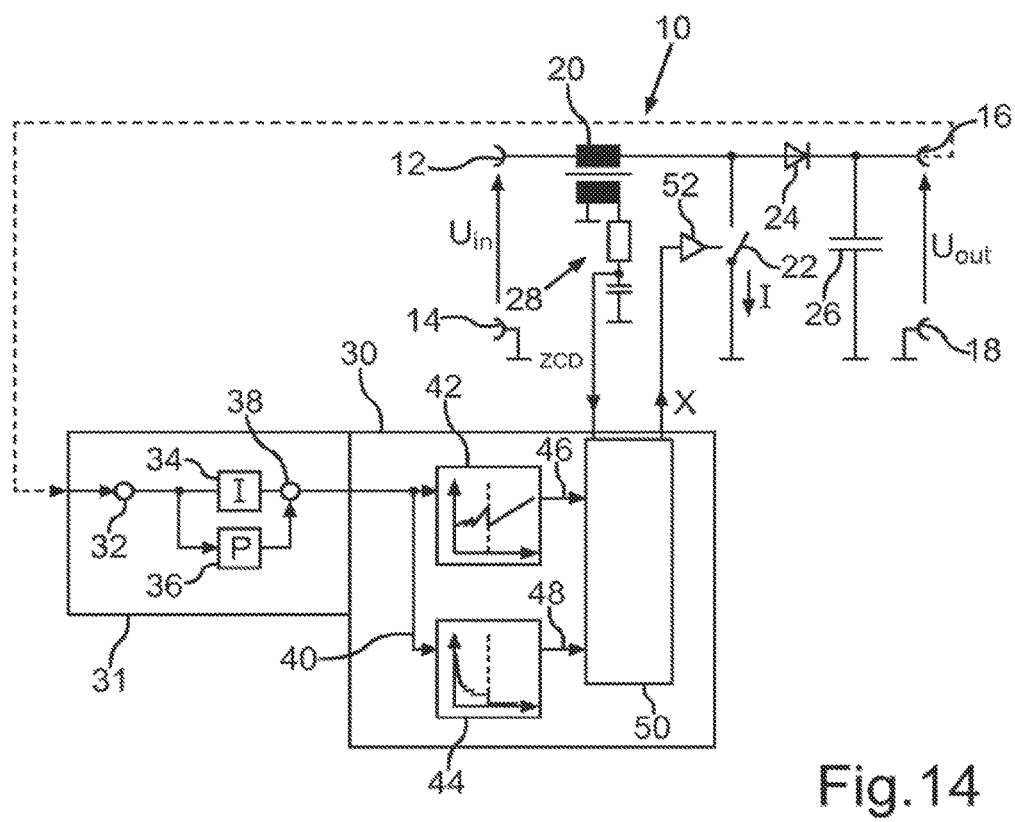
FIG. 14 shows a circuit diagram of an energy converter as shown in FIG. 1 but supplemented by a control unit.

FIG. 14 shows an electronic circuit of an energy converter and the energy converter 10 of FIG. 1, FIG. 14 supplementally showing a control unit 30 which completes the circuit of FIG. 1. With respect to the components described already with respect to FIG. 1, reference is made to the corresponding preceding part of the description.

The control unit 30 has an input terminal 32 which is electrically coupled to the connecting terminal 16. Control unit 30 thus has information of the output voltage $U_{out}$ between connecting terminals 16, 18, provided by the energy converter 10, especially as it is also connected, as cannot be seen from FIG. 14, to the reference potential of the connecting terminals 14, 18, already mentioned previously. Not shown in FIG. 14 either is a comparison of the information about the output voltage $U_{out}$ with a nominal value allocated to it and neither that the result of this comparison is utilized for further processing.

The control unit 30 provides the deviation of the upper voltage $U_{out}$ from its nominal value both at an integration unit 34 and at a proportional unit 36. These process the signal provided at the input terminal 32 and generate from it output signals which are combined via a linking unit 38 to form a first signal 40. This first signal 40 is a signal which is proportional to the switch-on time of the MOSFET 22 at least in a particular power range.

The first signal 40 is supplied to a first timer 42 and a second timer 44. The first timer generates a second signal 46 for a clock generator 50 connected to it which presently is configured as PWM unit.

Furthermore, it is known from US 2012/0286686 A1 that the switch-on time $t_{on}$ cannot drop below a minimum switch-on time $t_{on\_min}$. As soon as the first signal 40 reaches the value for the minimum switch-on time $t_{on\_min}$, the usual proportionality is left and instead a constant value for the switch-on time $t_{on}$ is conveyed as second signal 46 to the clock generator 50. Accordingly, the proportionality is only given within the first power range. Within the second power range, the minimum switch-on time $t_{on\_min}$ is given which is constant in this range. From the second signal provided by the first timer 42, the clock generator 50 generates a control signal X which is applied via a driver chip 52 to a gate terminal of the MOSFET 22. The second signal 46 thus controls the period of switch-on of the MOSFET 22.

The control unit 30 also has a second timer which generates from the first signal 40 a third signal 48 which represents a supplemental switch-off time $t_{off\_add}$. This signal 48 is also supplied to the clock generator 50 like the signal 46. In FIG. 14, a PI controller is implemented with the integration unit 34, the proportional unit 36 and the logic operations unit 38, as it is used as a rule for clocked electronic energy converters in PFC mode. The controller usually always calculates the switch-on time. In summary, the input terminal of the control unit 30 and the integration unit 34, the proportional unit 36 and the logic operations unit 38 are designated as adjustment unit 31. In this context, the adjustment unit 31 can be part of the control unit 30 or exist as a separate unit from the former, the output of the logic operations unit 38 being connected to an input terminal of the control unit 30 for providing the first signal 40 in the latter case.

In distinction from the teaching of US 2012/0286686 A1 it is provided in the case of the first timer 42 according to the present disclosure that the proportionality is limited by the fact that a minimum switch-on time $t_{on\_min}$ cannot be under-run, in such a manner that in the case of underrunning of the minimum switch-on time $t_{on\_min}$ by the switch-on time $t_{on}$ the second timer provides at its output a signal 48 which represents a predeterminable constant supplemental switch-off time $t_{off\_add}$. At the same time, the first timer 42 provides at its output a signal 46 which has a step-shaped increase in the switch-on time $t_{on}$ after a change into the second power range.

The exact method will be explained in the text which follows by means of the representation in FIG. 15. The structure of the diagram corresponds to that as in FIG. 3, the behavior in a first power range I, the lower boundary of which is at approx. 12 W, being identical with that in FIG. 3. In distinction from the teaching of US 2012/0286686 A1, however, the switch-on time $t_{on}$ is not limited to the minimum switch-on time $t_{on\_min}$ in a second power range II. In contrast to a continuous increasing of the supplemental switch-off time $t_{off\_add}$ starting from 0 µs with decreasing power to be transmitted by the energy converter starting from the threshold at approx. 12 W, it is provided according to the present disclosure to carry out, when reaching the minimum switch-on time $t_{on\_min}$ by the switch-on time $t_{on}$, simultaneously a jump both in the switch-on time $t_{on}$ and in the supplemental switch-off time $t_{off\_add}$. The course of the switch-on time $t_{on}$ and of the supplemental switch-off time $t_{off\_add}$ as function of the power P to be transmitted by the energy converter, was then determined as follows:

To obtain a lower power P, the switch-on time $t_{on}$ is first lowered;

this happens up to a minimum switch-on time $t_{on\_min}$.

If the minimum switch-on time $t_{on\_min}$ is underrun, the additional supplemental switch-off time $t_{off\_add}$ is increased by one period.

At the same time, however, the switch-on time $t_{on}$ is increased again by such an amount that the transmitted power does not exhibit any unsteadiness.

Please note the different scaling of the ordinate of the switch-on time $t_{on}$ and of the additional supplemental switch-off time $t_{off\_add}$.

Figure 15:
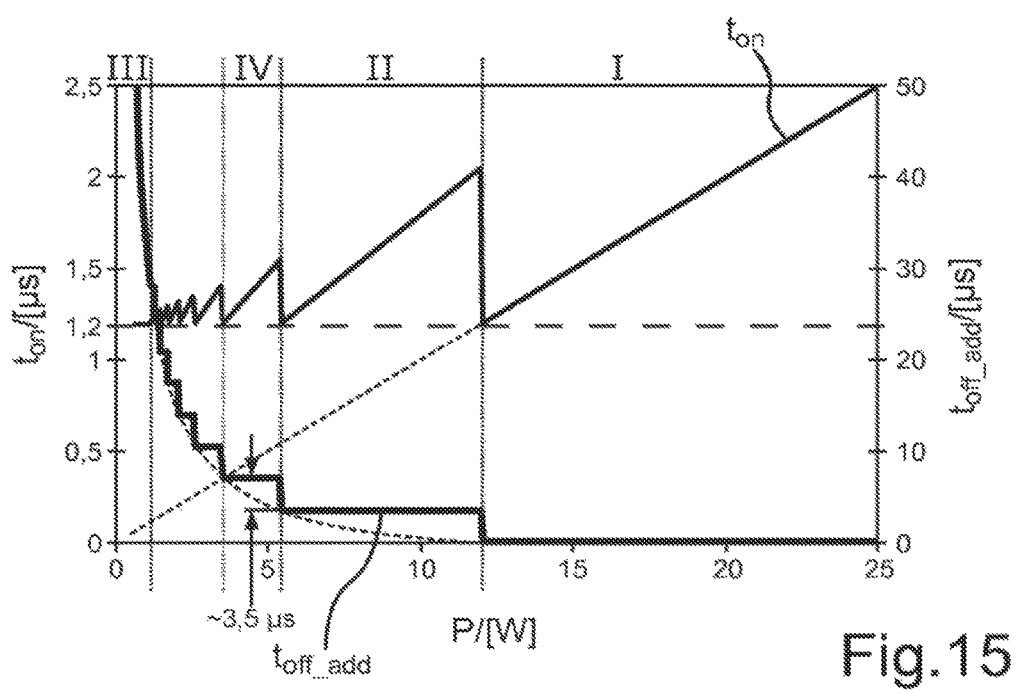
FIG. 15 shows a diagram in which two graphs are shown diagrammatically which, by way of example, represent the variation of the switch-on time and of the supplemental switch-off time in dependence on a power to be transmitted by the energy converter according to a first exemplary embodiment of the present disclosure.

FIG. 15 shows some noteworthy characteristics of the variation of the two functions of the switch-on time $t_{on}$ and of the supplemental switch-off time $t_{off\_add}$ in dependence on the power P to be transmitted. With the jump height of the supplemental switch-off time $t_{off\_add}$ remaining the same, the jump height of the switch-on time $t_{on}$ becomes progressively smaller. The local maxima of the switch-on time $t_{on}$ arising during this process suggest the assumption that they could be joined to one another approximately by a straight line. This straight line approximately intersects the ordinate at the value of the minimum switch-on time $t_{on\_min}$ 1.2 µs in the example shown here. For the direct-voltage case, that is to say a constant input voltage $U_{in}$ and a constant output voltage $U_{out}$ at the converter, the curve sections can be determined arithmetically. In fact, the sawtooth-shaped sections are not sections of straight lines but solutions, depending on the respective parameter of the supplemental switch-off time $t_{off\_add}$ of a quadratic equation. For an implementation of the method for example in a microcontroller-controlled energy converter, however, a linear approximation is completely adequate. In any case, deviations from the dependencies emerging with the assumption of a lossless energy transmission can be expected here due to parasitic influences of a real circuit. Immediately before the jumps in a respectively smaller power range, the pairs of values for the switch-on-time $t_{on}$ and the supplemental switch-off time $t_{off\_add}$, according to FIG. 15, are identical with the pairs of values as shown in FIG. 3, in any case.

From a certain boundary, that is to say a large supplemental switch-off time $t_{off\_add}$, onward, it is sufficient to increase only $t_{off\_add}$ by in each case several periods of the value $t_{off\_step}$. The method is suitable for the implementation in the digital system, the resolution is initially retained in the lower range of the power P since the switch-on time is lowered time and again by one tick, that is to say one smallest processor clock cycle. Since the latter, however, is kept greater than a particular value, a minimum resolution is retained. From a certain supplemental switch-off time $t_{off\_add}$, it is then possible to change back to the continuous method since the frequency is relatively low. In FIG. 15, this range is drawn as third power range III with a constant switch-on time $t_{on}$ which is here 1.2 µs. A power range adjoining directly below the second power range II with a constant value of the supplemental switch-off time $t_{off\_add}$, increased with respect to the value of the supplemental switch-off time $t_{off\_add}$ present in the second power range II is designated as fourth power range IV. Further power ranges not designated in greater detail are indicated in FIG. 15 between the fourth power range IV and the third power range III by corresponding synchronous jump-shaped increase in the switch-on time $t_{on}$ and the supplemental switch-off time $t_{off\_add}$. A hysteresis during switch-over can create a remedy if in the vicinity of the jumps no stable operation occurs within a power range, that is to say a so-called "nattering" occurs.

Figure 16:
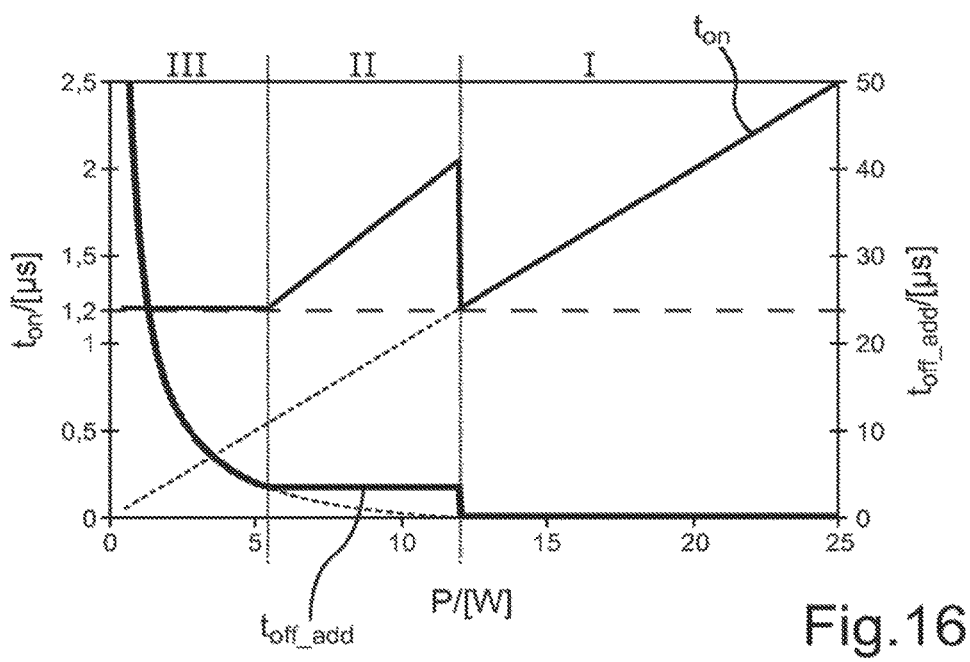
FIG. 16 shows a diagram in which two graphs are shown diagrammatically which, by way of example, represent the variation of the switch-on time and the supplemental switch-off time in dependence on a power to be transmitted by the energy converter according to a second exemplary embodiment of the present disclosure.

In a second exemplary embodiment, a step-down converter can be used for operating LEDs. In this arrangement, the monotony and the continuity of the transfer function are particularly important. It is, therefore, proposed to provide only one jump, this having a hysteresis, however. This appears possible because the oscillation is greatly attenuated. A return to the continuous course of the supplemental switch-off time $t_{off\_add}$ should, therefore, be possible with a relatively small additional supplemental switch-off time $t_{off\_add}$. One possible embodiment is shown in FIG. 16 by means of the course of the switch-on time $t_{on}$ and the supplemental switch-off time $t_{off\_add}$ as a function of the power to be transmitted by the energy converter P. In this arrangement, the first power range I, as already shown in FIGS. 3 and 15, extends above a power of 12 W. Directly underneath, a second power range II adjoins, as also shown already in FIG. 15, with a lower limit of approx. 5.5 W. In this second power range, a supplemental switch-off time $t_{off\_add}$ is effective which is not equal to zero. This supplemental switch-off time $t_{off\_add}$ is advantageously equal to one half of the period of the previously documented oscillation across the MOSFET. The switch-on time $t_{on}$ is corrected in the second power range II in accordance with the previous statements so that an equal power transmission of the energy converter is given again as if the control had occurred analogously in continuation of the first power range I. In contrast to the embodiment according to FIG. 15, the third power range III directly adjoins the second power range II, that is to say below the limit of approx. 5.5 W, the power to be transmitted by the energy converter being less than in the second power range II and the power to be transmitted by the energy converter being adjusted by means of a constant switch-on time $t_{on}$ which advantageously assumes the value of the minimum switch-on time $t_{on\_min}$ and by means of a supplemental switch-off time $t_{off\_add}$ increasing with decreasing power, the supplemental switch-off time being adjusted continuously in this power range. This embodiment is proposed particularly for the application with a step-down converter in the case of which the oscillation forming across the electronic switching element in the form of the MOSFET 122 is greatly attenuated by the load which can be formed, for example, by a LED.

In a further embodiment, a fourth power range IV, which then extends between the power to be transmitted by the energy converter P between approx. 3.5 W and 5.5 W can be inserted between the second power range II and the third power range III according to FIG. 16. This fourth power range IV is designed in the manner like the second power range II and corresponds to the fourth power range IV in FIG. 15. In distinction from the embodiment according to FIG. 15, no further power ranges, in which the supplemental switch-off time is abruptly increased, then follow below this fourth power range IV but the third power range III then follows directly underneath the 3.5 W limit.

For the operation of a step-up converter which, at the same time, also fulfils the functionality of a power factor controller, a method having a first power range I is proposed in which the power to be transmitted by the energy converter is controlled by changing the switch-on time $t_{on}$ and the supplemental switch-off time is constantly zero, and with a second power range in which a constant supplemental switch-off time $t_{off\_add}$ is present, and after an abrupt increase in the switch-on time $t_{on}$ in the transition between the two power ranges the switch-on time $t_{on}$ is reduced further continuously again reached. Furthermore, a control principle having a continuous increase in the supplemental switch-off time $t_{off\_add}$ with decreasing power to be transmitted by the energy converter P and with a constant switch-on time $t_{on}$ is proposed in a third power range III which is arranged below a predeterminable limit.

In this context, it can be provided that the third power range III adjoins directly seamlessly to the second power range II.

Alternative embodiments have at least one further power range in which the control of the power to be transmitted through the energy converter takes place analogously to the second power range II. These further power ranges adjoin one another seamlessly in order to close the gap between the third power range III and the second power range II completely. The largest power range of these power ranges freely selectable in number can thus be designated as the fourth power range IV known from the previous exemplary embodiment.

Advantageously, the supplemental switch-off time $t_{off\_add}$ is increased by one step length during the transition from the second power range II into the fourth power range IV. The predetermined value $t_{off\_step}$ of this step length is advantageously equal to the period of the previously used electrical oscillation across the electronic switching element. Alternatively or additionally, the step length can be increased to a multiple of this value $t_{off\_step}$ especially towards lower powers. By this means, the number of necessary steps and thus possibly instabilities during the operation of an energy converter according to the method described can be advantageously avoided or reduced, respectively. The increase in the supplemental switch-off time $t_{off\_add}$ is not defined for a particular timing pattern. Especially the first increment starting from the supplemental switch-off time $t_{off\_add}=0$ µs on leaving the first power range I can deviate considerably from the subsequent increments. Due to necessary adaptations to the hardware used which, as electronic front-end device (EFD), can have especially a microcontroller and apart from other electronic power components also filter elements having particular frequency requirements, the subsequent increments can also for their part be adapted individually.

Ranges having a stepped increase of the supplemental switch-off time $t_{off\_add}$ in each case on transition from a higher power range to a lower power range, for example from the first power range I into the second power range II or from the second power range II into the fourth power range IV, and ranges having a limitation of the switch-time $t_{on}$ at a transition from a higher power range to a lower power range to the value of a minimal switch-on time $t_{on\_mine}$ for example from the fourth power range IV into the third power range III, wherein the switch-on time $t_{on}$ is then kept constant in the lower power range and the supplemental switch-off time $t_{off\_add}$ is continuously controlled, can be combined with one another arbitrarily.

When the energy converter is fed with an alternating voltage, particularly a sinusoidal alternating voltage, the magnitude of the switch-on time $t_{on}$ or of the supplemental switch-off time $t_{off\_add}$, which is in each case variable in dependence on power, can be set to be constant within a half or complete period of the alternating voltage used, the respective value then being determined in such a way that the same transmission characteristic of the energy converter is obtained as in the case of feeding with a direct voltage, the value of which is equal to the effective value of the alternating voltage present.

An exemplary implementation of a method according to the activation as is shown in FIG. 15 can take place in such a manner that the individual power ranges are managed via a state machine. In this context, the supplemental switch-off time $t_{off\_add}$ can be increased by the corresponding value changing from the first power range I into the second power range II. At the same time, the corresponding value for the switch-on time $t_{on}$ is deposited in the state machine in which time a jump back into the first power range I is intended to take place again. This procedure can be applied successively to each further stepped transition also with deviating step length. The value of the switch-on time $t_{on}$ at which a jump back from a lower power range into the next higher power range is to take place again can be adapted in such a manner that a hysteresis is produced in consequence of which, after the jump back into the next higher power range the minimum switch-on time $t_{on\_min}$ is not set for the switch-on time $t_{on}$ but a correspondingly higher value. In this way, instabilities due to a permanent change of range can be avoided which, for example, can be given by a finite resolution of the digital system.

The embodiments are only used for explaining the present disclosure and are not restrictive for the latter. Thus, functions, particularly electronic components and the energy converter can be naturally designed arbitrarily without departing from the concept of the present disclosure.

The advantages and features and embodiments described for the method according to the present disclosure apply similarly to the energy converter according to the present disclosure and conversely. In consequence, corresponding device features can be provided for method features and conversely.

Thus, it has been shown in conclusion how, through the skilled choice of switching times, converter circuits, especially boost and buck topologies, in the field of the transition from transition mode to discontinuous mode can be optimized. The circuit topologies operated with the corresponding method can, therefore, also be used in critical LED applications within a wide power range.

While the disclosed embodiments have been particularly shown and described with reference to specific embodiments, it should be understood by those skilled in the art that various changes in form and detail may be made therein without departing from the spirit and scope of the disclosed embodiments as defined by the appended claims. The scope of the disclosed embodiments is thus indicated by the appended claims and all changes which come within the meaning and range of equivalency of the claims are therefore intended to be embraced.

The invention claimed is:

1. A clocked electronic energy converter having
   an electronic switching element,
   at least two electrical energy storage devices,
   a first terminal for connecting to an electrical energy source,
   a second terminal for connecting to an electrical energy sink,
   a clock generator for controlling the electronic switching element during switching operation,
   an input terminal for a first signal adjusting a power to be transmitted by the energy converter,
   a first timer connected to the clock generator and to the input terminal, for providing a second signal representing a switch-on time, the clock generator being designed to adjust the power to be transmitted by the energy converter in a first power range, wherein the power to be transmitted by the energy converter in a first power range is configured to be adjusted by the switch-on time of the electronic switching element, and a second timer connected to the clock generator and the input terminal for providing a third signal representing a supplemental switch-off time in a second power range in which the power to be transmitted by the energy converter is less than in the first power range, the clock generator being designed to adjust the power to be transmitted by the energy converter in the second power range, wherein the power to be transmitted by the energy converter in the second power range is configured to be adjusted by a combination of the second and the third signal, wherein the third signal is constant.

2. The energy converter as claimed in claim 1, wherein the clock generator is designed, to start, on reaching a predeterminable energy content of one of the at least two electrical energy storage devices, a new clock cycle which begins with an additional switch-off phase of the electronic switching element having a duration of the supplemental switch-off time, the additional switch-on phase being followed by a switch-on phase of the electronic switching element with a duration of the switch-on time.

3. The energy converter as claimed in claim 1, wherein the first tinier is designed to carry out the determination of the switch-on time in the second power range, taking into consideration an electrical voltage present at the first terminal and/or an electrical voltage present at the second terminal.

4. The energy converter as claimed in claim 3, wherein the first timer is designed to determine a voltage wave shape of the electrical voltage present at the first terminal and to determine the switch-on time in the second power range in dependence on the voltage wave shape determined.

5. A lighting device having an illuminant and an electrical terminal for connecting the lighting device to an electrical energy source, wherein the lighting device has a clocked electronic energy converter, the clocked electronic energy converter having an electronic switching element, at least two electrical energy storage devices, a first terminal for connecting to an electrical energy source, a second terminal for connecting to an electrical energy sink, a clock generator for controlling the electronic switching element during switching operation, an input terminal for a first signal for adjusting a power to be transmitted by the energy converter, a first timer connected to the clock generator and to the input terminal, for providing a second signal representing a switch-on time, the clock generator being designed to adjust the power to be transmitted by the energy converter first power range, wherein the power to be transmitted by the energy converter in a first power range is configured to be adjusted by the switch-on time of the electronic switching element, and a second timer connected to the clock generator and the input terminal for providing a third signal representing a supplemental switch-off time in a second power range in which the power to be transmitted by the energy converter is less than in the first power range, the clock generator being designed to adjust the power to be transmitted by the energy converter in the second power range, wherein the power to be transmitted by the energy converter in the second power range is configured to be adjusted by a combination of the second and the third signal, wherein the third signal is constant.

6. A method for adjusting an electrical power to be transmitted by a clocked electronic energy converter, for which purpose an electronic switching element of the electronic energy converter is operated in a clocked manner with a switch-on time, the power to be transmitted by the energy converter being adjusted in a first power range by adjusting the switch-on time, and being less in a second power range, in which the power to be transmitted by the energy converter is less than in the first power range, the power to be transmitted by the energy converter being adjusted by combining the switch-on time and the supplemental switch-off time, the method comprising, specifying the supplemental switch-off time as constant.

7. The method as claimed in claim 6, wherein a change from the first power range into the second power range is executed when the switch-on time in the first power range drops below the value of a predeterminable minimum switch-on time.

8. The method as claimed in claim 6, wherein in a third power range, in which the power to be transmitted by the energy converter is less than in the second power range, the power to be transmitted by the energy converter is adjusted by adjusting a constant switch-on time and by adjusting a supplemental switch-off time increasing with decreasing power.

9. The method as claimed in claim 8, wherein in a fourth power range, in which the power to be transmitted by the energy converter is less than in the second power range and greater than in the third power range, the supplemental switch-off time is specified as constant and greater than the supplemental switch-off time in the second power range.

10. The method as claimed in claim 9, wherein in the case of a change from the second power range into the fourth power range, the supplemental switch-off time is increased by a predeterminable value and in the case of a change from the fourth power range into the second power range, the supplemental switch-off time is reduced by the predeterminable value.

11. The method as claimed in claim 6, wherein the switch-on time in the second power range is determined in dependence on a first signal, by setting a power of the energy converter to be transmitted, in such a manner that the power to be transmitted depends on the first signal in the same manner as if the power to be transmitted were to be controlled analogously to the first power range.

12. The method as claimed in claim 6, wherein in the case of a continuous changing of the power to be transmitted associated with a change of the power range a stepless changing of the power transmission of the energy converter is produced.

13. The method as claimed in claim 6, wherein the switch-on time in the second power range is determined with consideration of a constant voltage amplitude and a constant curve shape for an electrical voltage of an energy source connected to the energy converter and an electrical voltage provided by the energy converter is determined for a load connected to the energy converter in such a manner that the switch-on time depends exclusively on the power to be transmitted.

14. The method as claimed in claim 6, wherein an alternating voltage is applied to the energy converter at its input and it is controlled in such a manner that an input power factor is maximized.

15. The method as claimed in claim 14, wherein the switch-on time and/or the supplemental switch-off time is specified as constant with a constant power to be transmitted by the energy converter within a half or complete period of the alternating voltage present at the input end.

* * * * *

UNITED STATES PATENT AND TRADEMARK OFFICE
CERTIFICATE OF CORRECTION

PATENT NO. : 10,251,227 B2
APPLICATION NO. : 15/516041
DATED : April 2, 2019
INVENTOR(S) : Siegfried Mayer et al.

It is certified that error appears in the above-identified patent and that said Letters Patent is hereby corrected as shown below:

In the Claims

Column 21, Line 29, Claim 3; please change "the first tinier" to --the first timer--

Column 21, Line 59, Claim 5; please change "the energy converter first power range" to --the energy converter in a first power range--

Signed and Sealed this
Eighteenth Day of June, 2019

Andrei Iancu
*Director of the United States Patent and Trademark Office*